Sept. 18, 1962 W. E. BRAINARD ET AL 3,054,333
MACHINE TOOL INDEXING AND PALLET CLAMPING MECHANISM
Filed June 27, 1958 7 Sheets-Sheet 1

INVENTORS
Wallace E. Brainard,
John A. Hansen,
Robert K. Sedgwick, Charles B. Sipek
BY
Attorney

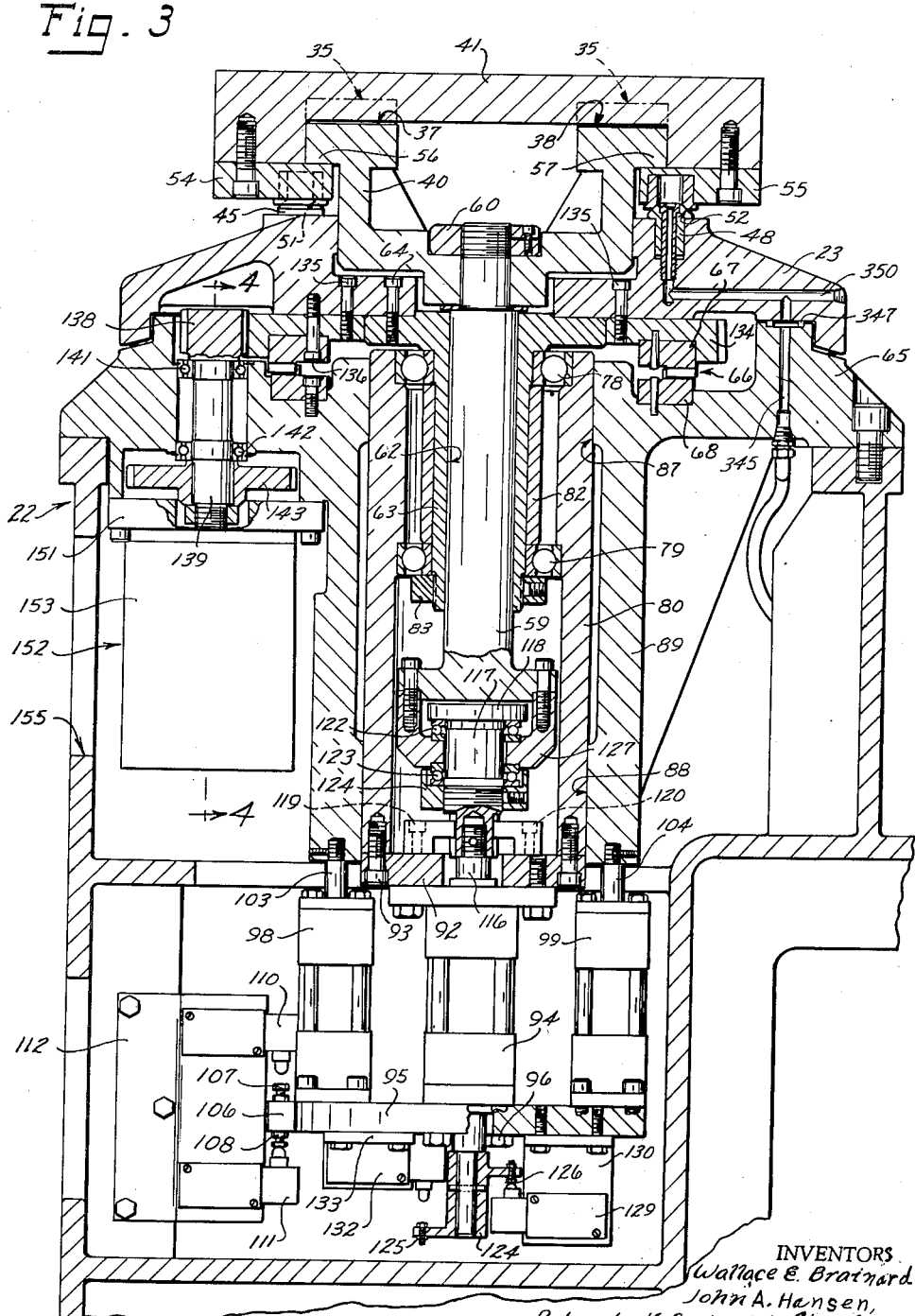

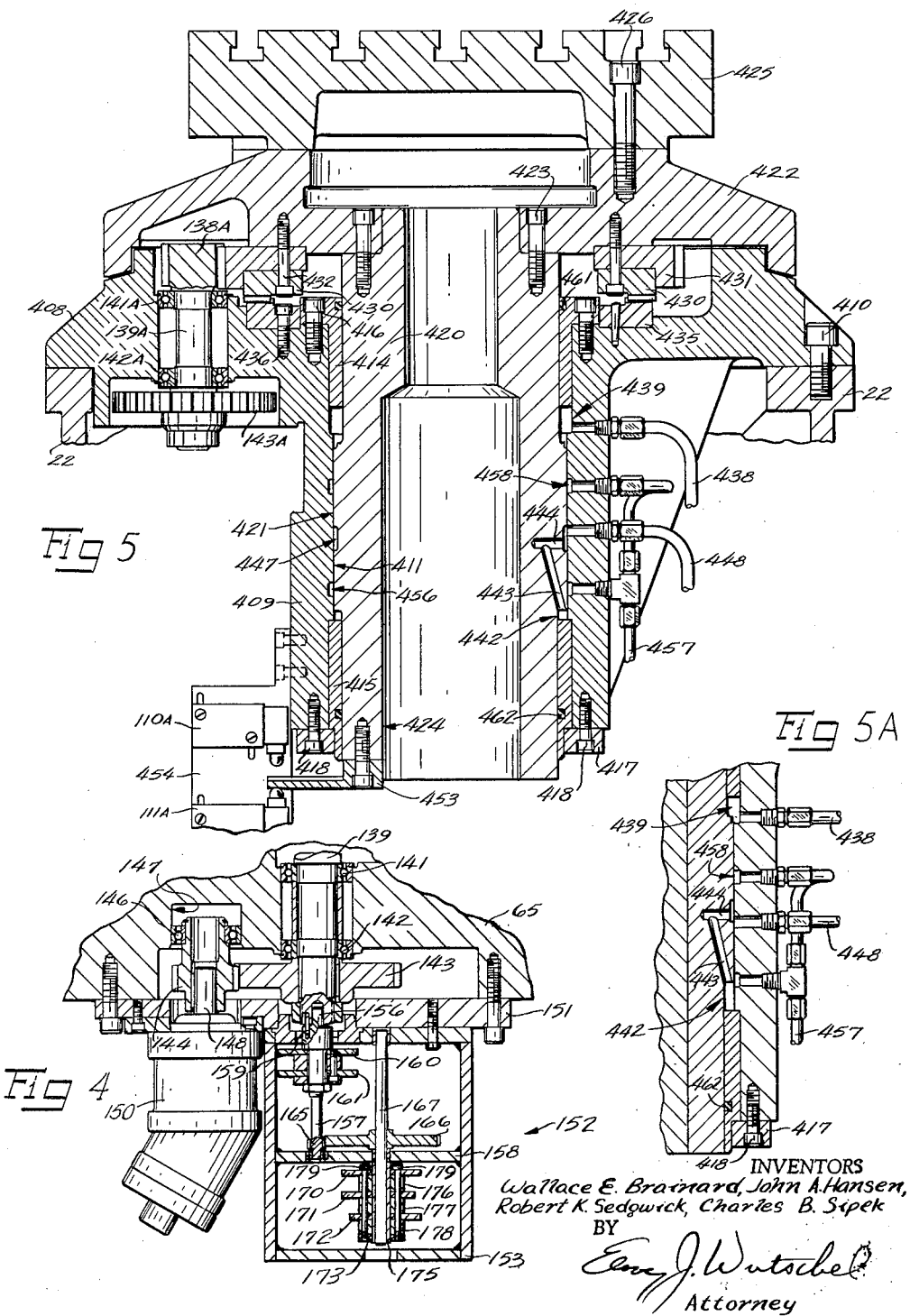

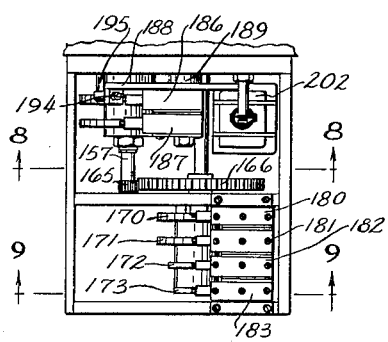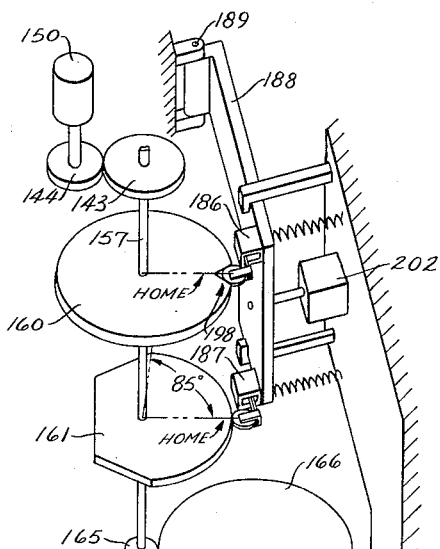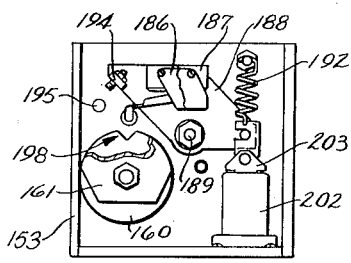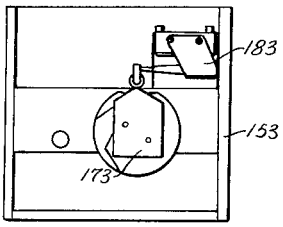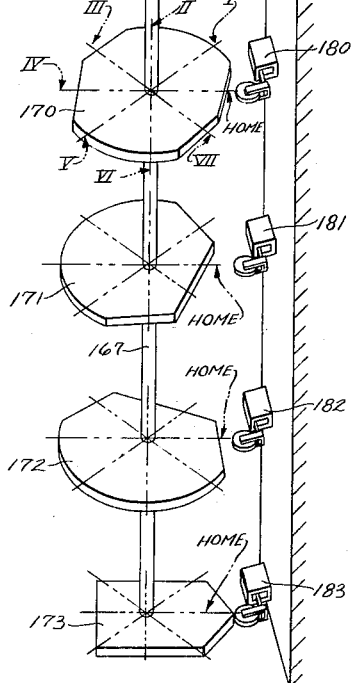
INVENTORS
Wallace E. Brainard, John A. Hansen,
Robert K. Sedgwick, Charles B. Sipek
BY
Attorney

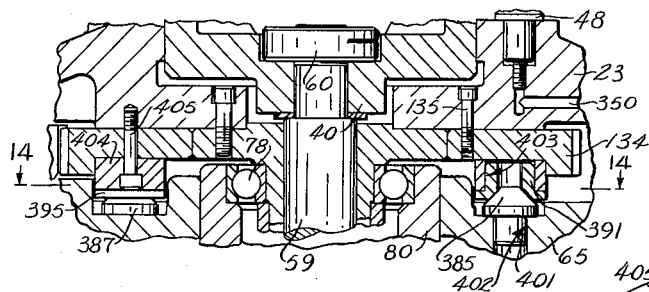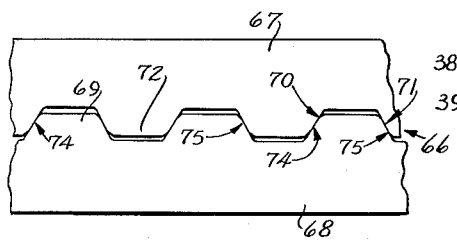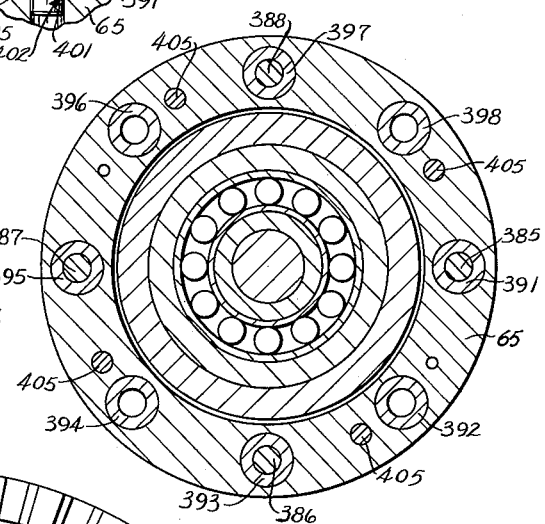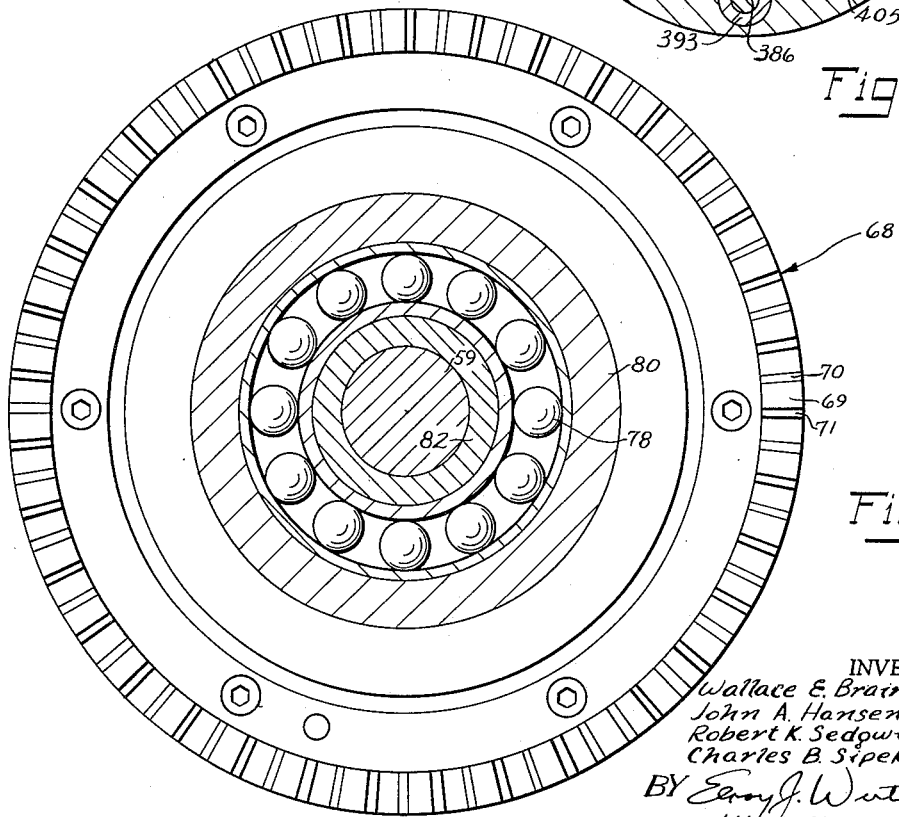

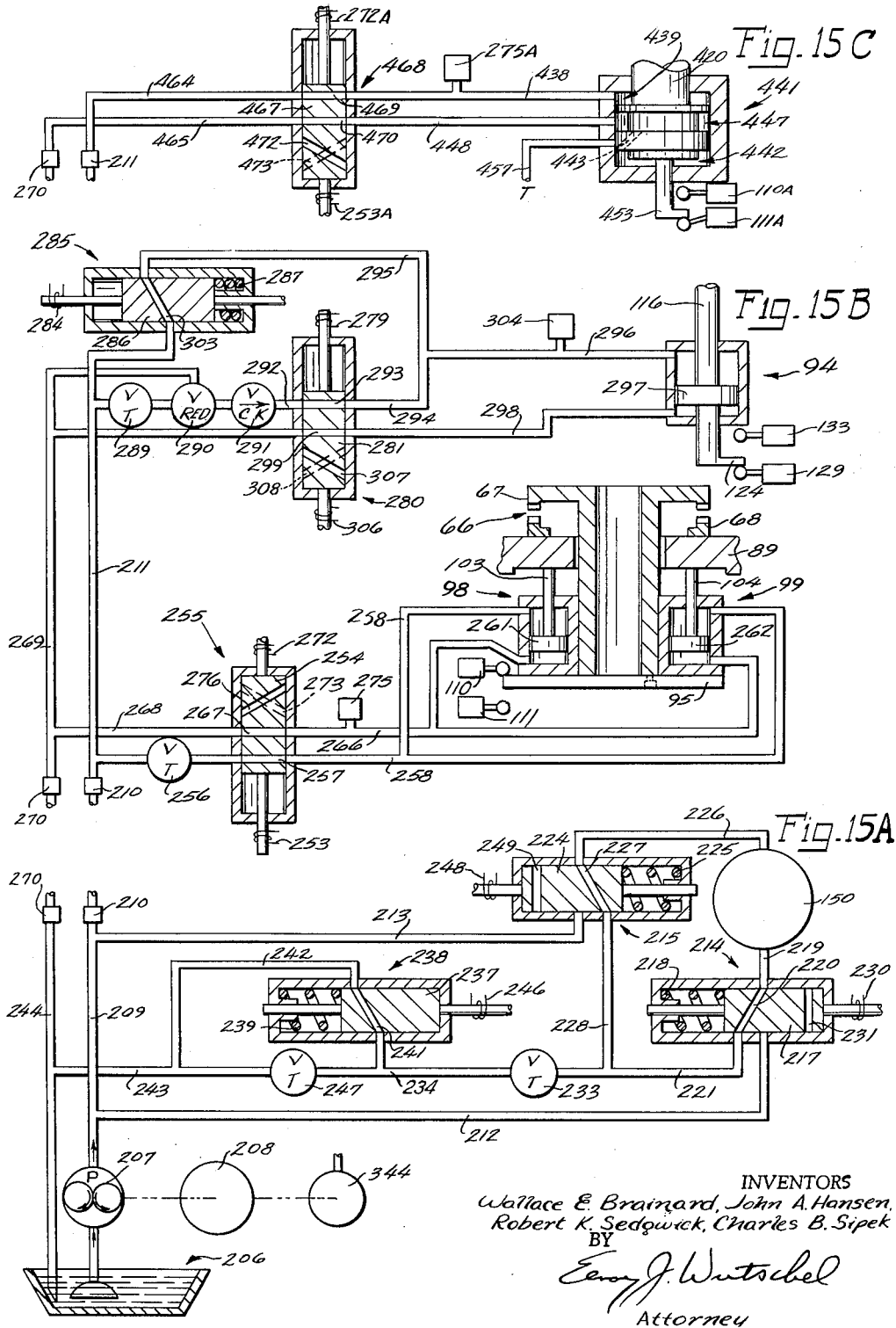

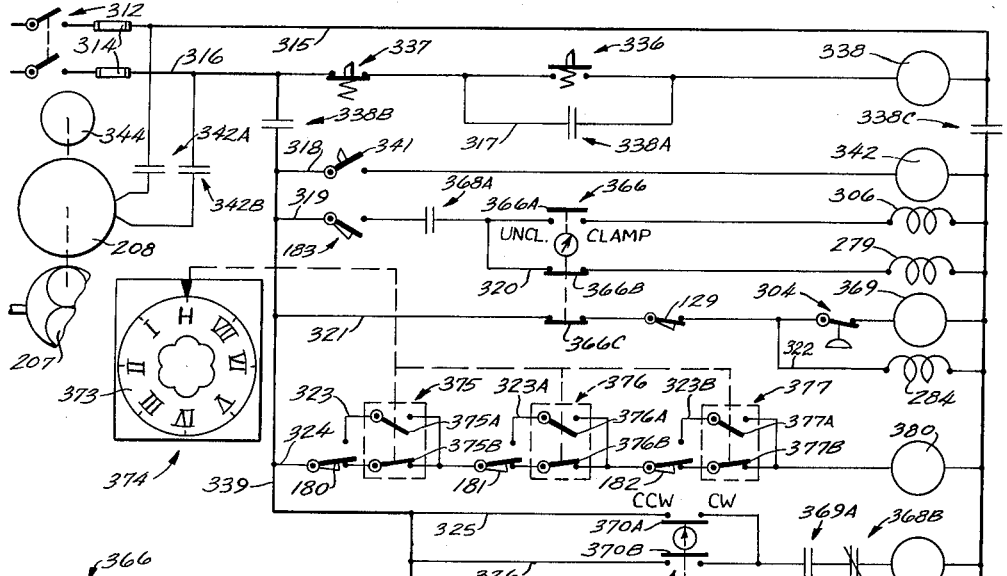
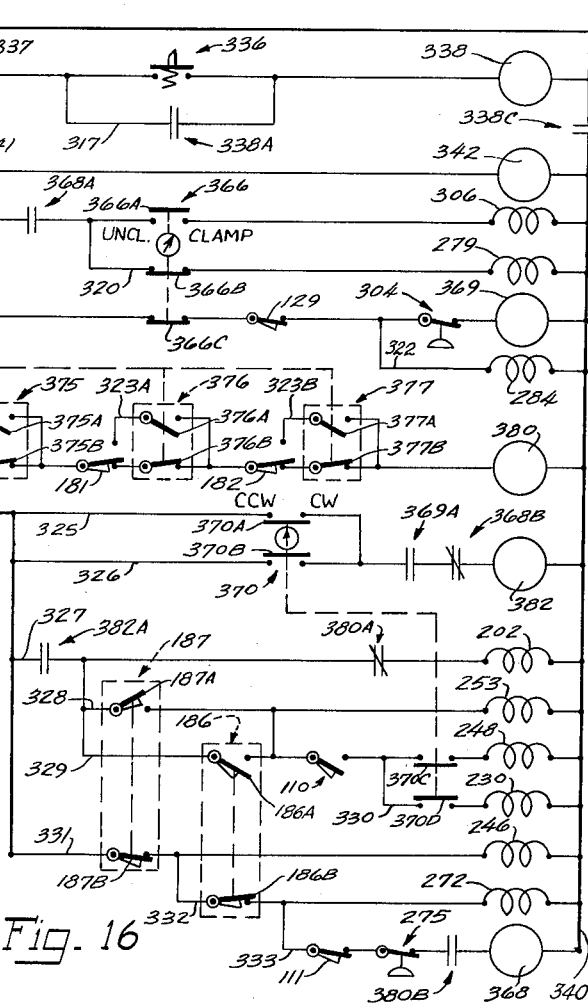
Fig. 17
Fig. 16
Fig. 18
Fig. 20
Fig. 19
INVENTORS
Wallace E. Brainard, John A. Hansen,
Robert K. Sedgwick, Charles B. Sipek
BY
Attorney

United States Patent Office 3,054,333
Patented Sept. 18, 1962

3,054,333
MACHINE TOOL INDEXING AND PALLET CLAMPING MECHANISM
Wallace E. Brainard, Milwaukee, John A. Hansen, Greendale, Robert K. Sedgwick, Waukesha, and Charles B. Sipek, Hales Corners, Wis., assignors to Kearney & Trecker Corporation, West Allis, Wis., a corporation of Wisconsin
Filed June 27, 1958, Ser. No. 745,187
9 Claims. (Cl. 90—56)

This invention relates generally to improvements in machine tool indexing mechanisms, and more particularly to an improved indexable and positioning clamping mechanism for a rotary work support in combination with a unitary pallet clamp and transfer device.

A general object of this invention is to provide an improved, simplified index mechanism for a rotatable work support.

Another object of the invention is to provide an improved index control mechanism for a rotatable work support including a single disengageable coupling operable to effect both final positioning movement and clamping of the work support in the selected position.

Another object of the invention is to provide an improved disengageable coupling adapted to precisely position an indexable support member radially, horizontally, and in a plane perpendicular to the axis of support rotation.

Another object is to provide an improved index mechanism incorporating a rotatable index table carried for a slight axial movement in either direction, with the table being movable in one direction to facilitate rotatable indexing, and with the table being movable in the opposite direction to effect both final angular positioning, as well as clamping at the next selected index station.

Another object of the invention is to provide an improved rotary table index mechanism arranged to utilize axial movement of the table for effecting both final slight angular positioning from an approximate selected index station, as well as clamping of the worktable to the support member.

Another object of the invention is to provide improved apparatus for positioning and clamping an indexable table to a support member, as well as an improved releasable clamp for fixedly securing a work supporting pallet to the rotary table.

Another object of the invention is to provide an improved unitary supporting structure for a selectively indexable rotary table, as well as an associated axially movable work supporting pallet clamp together with actuating mechanism for releasably positioning and clamping the table relative to the frame, and releasably actuating the pallet clamp into clamping engagement with the rotary table.

A further object of the invention is to provide an improved binary coded switching arrangement, in combination with a retractable creep-stop switch mechanism, for indexably advancing a rotatable work support to a selected index station at rapid rate, automatically reducing the rapid rate to a creep rate upon approaching the selected station, and stopping table rotation at the required selected index station.

Another object of the invention is to provide an improved cam actuated binary coded switch control system responsive to a manually adjustable binary coded switch mechanism and actuatable upon associated power drive means to effect indexable advancement of an indexable member from any existing position to a next selected station, in a manner that nonelected intermediate stations may be selectively by-passed.

Another object of the invention is to provide a selectively movable work support adapted to receive a work carrying pallet, in combination with a pressurized air system operatively connected to clean the associated mating surfaces respectively presented by the movable work support and the work carrying pallet.

Another object of the invention is to provide an improved index control circuit for effecting predetermined indexable advancement of a rotatable work support and incorporating cam actuated binary coded switch mechanism operable to establish a coincidence circuit for stopping index movement in any predetermined selected station.

According to this invention, a machine tool, such as a milling and boring machine, is provided with an improved indexable worktable adapted to be selectively indexed to one of a plurality of index positions. To accomplish this, a machine frame provided with a power driven tool spindle is adapted to rotatably support a cooperating worktable that is likewise carried for a slight axial movement. For indexably positioning the worktable, a pair of coupling members provided with cooperatively intermeshing, angularly formed projections are respectively secured to the worktable and the frame. The respective projections presented by the clamping members are angularly formed, and are disposed in concentricity to the rotational axis of the worktable. The arrangement is such that axial bodily movement of the angular projections into meshing engagement operates to effect final angular and radial positioning movement of the worktable. Likewise, with the cooperating coupling projections urged into locking engagement, the worktable is fixedly clamped against angular movement in a plane perpendicular to its axis of rotation. To this end, a reversible power drive mechanism is connected to effect axial movement of the worktable in one direction for disengaging the coupling members to facilitate indexable movement, and in the opposite direction for effecting final positioning and clamping. To effect rotatable indexing movement, whenever the coupling projections are disengaged, a separate power drive is connected to rotate the worktable and a binary coded switch actuating cam mechanism. For determining the extent of indexable advancement, a binary coded selector switch mechanism operates to condition the cam actuated switches in a manner that the cooperating cam mechanism operates the switches to stop movement upon arrival of the worktable at its approximate next selected station. To prevent overtravel, the coacting cam and switch mechanism reduce the speed of indexing movement from a rapid to creep rate prior to stopping movement. Rotation of the power drive is stopped within the range of engagement of the angularly formed coupling member projections. Thereupon, the power drive mechanism effects axial movement of the worktable to reengage the angular coupling member projection for effecting final positioning movement to the selected index station. The selector switch mechanism and binary coded cam actuated switches are incorporated in a control system including an index cycle start switch and electro-hydraulic control system for sequentially effecting disengagement of the coupling members, rotational advancement to the next station, and reengagement of the coupling members.

To retain a work carrying pallet in cutter engaging relationship, the rotatably indexable worktable is provided with an axially movable pallet clamp connected to be operated by a power driven actuator extending through an axially bored opening formed in the table. With the clamp in disengaged position, way surfaces presented thereby are disposed to cooperate with transfer way surfaces spaced adjacent the table. By means of this arrangement, a work carrying pallet may be transferred to an approximate centrally located position upon the table. Cooperating spaced apart tapered pins and recesses respectively presented by adjacent faces of the pallet and table coact during clamping movement to precisely position the pallet and work upon the indexable table. As the power actuator is operated to effect axial clamping movement of the pallet clamp, jets of air are directed from a common source to the respectively cooperating pins and recesses to forcibly remove any metal chips or debris that might lodge therebetween to preclude complete engagement. To insure proper positioning, the power actuator for the pallet clamp is first operated at relatively low power with full power then being applied to positively clamp the pallet to the index table during machining operations.

The foregoing and other objects of the invention which will become more fully apparent from the following detailed description of apparatus exemplifying this invention, may be achieved by the particular index mechanism and associated control apparatus described herein as a preferred embodiment thereof in connection with the accompanying drawings, in which:

FIG. 3 is an enlarged fragmentary view in transverse vertical section through the supporting frame, axially movable rotatable worktable, axially movable work clamp, together with the work pallet secured to the table;

FIG. 4 is an enlarged fragmentary view, partly in elevation and partly in longitudinal vertical section showing the power drive mechanism for the table and associated power driven binary coded cam mechanism and being taken generally along the line 4—4 in FIG. 3;

FIG. 5 is an enlarged fragmentary view in transverse vertical section through a modified form of an index table illustrating the principles of this invention;

FIG. 5A is an enlarged fragmentary view in transverse vertical section through a portion of the piston and cooperating cylinder for the table elevating mechanism illustrated in FIG. 5;

FIG. 6 is an enlarged fragmentary schematic diagram of the binary coded cam positioning mechanism in combination with the associated binary coded switches and the automatically retractable creep-stop switch mechanism;

FIG. 7 is a fragmentary view in front elevation of the binary coded cam and switching mechanism;

FIG. 8 is a view in horizontal section through the cam mechanism, taken generally along the line 8—8 in FIG. 7, with a portion of the creep control cam broken away and showing the creep-stop switch mechanism restracted, as at the beginning of any selected index cycle;

FIG. 9 is a view in horizontal section through the binary coded cam and switch control mechanism, taken generally along the line 9—9 in FIG. 7, and showing the home position indicating cam positioned to engage its associated switch;

FIG. 10 is an enlarged fragmentary view in transverse vertical section through a portion of the table support, the rotary table and pallet, showing in detail the cooperating tapered pin and pallet recess;

FIG. 11 is an enlarged view, partly in plan of the table support coupling member and partly in transverse horizontal section through the upper portion of the pallet clamp actuating mechanism;

FIG. 12 is an enlarged fragmentary view in side elevation showing the cooperatively intermeshing, angularly formed clutch teeth presented by the disengageable table coupling member and the stationary frame coupling member;

FIG. 13 is an enlarged fragmentary view in transverse vertical section through a modified form of the table index mechanism and showing a modified form of table coupling;

FIG. 14 is a view, partly in plan and partly in transverse vertical section taken generally along the lines 14—14 in FIG. 13, and showing the modified form of disengageable table coupling member;

FIG. 15A is a schematic hydraulic circuit diagram for effecting clockwise or counterclockwise index rotation at either a rapid or creep rate;

FIG. 15B is a fragmentary hydraulic circuit diagram for actuating the work pallet clamp mechanism and the table positioning clamp mechanism respectively;

FIG. 15C is a fragmentary, schematic hydraulic circuit diagram showing the power driven table coupling clamp actuator associated with the modified form of the invention shown in FIG. 5;

FIG. 16 is a diagrammatic representation of the power supply and control circuit for effecting the coordinately interrelated functions of work pallet clamping, as well as the coincidence circuit for effecting selective indexable and clamping movement of the worktable according to the actuation of the binary coded positioning switches and selector switches;

FIG. 17 represents a code showing the several operating positions for the pallet clamping switch 366, FIG. 16;

FIG. 18 is a code illustrating the contact bar positions of the binary code selector switches in response to actuation of the index selector switch mechanism 374, FIG. 16;

FIG. 19 illustrates a code showing the contact bar positions assumed upon actuation of the index cycle start switch 370, FIG. 16, for effecting either clockwise or counterclockwise indexing movement; and, FIG. 20 represents a code showing the approximate duration of actuation of the binary code switches, the home position indicating switch, and creep-stop switches, depending upon the angularly indexed position of the worktable.

Figure 2:
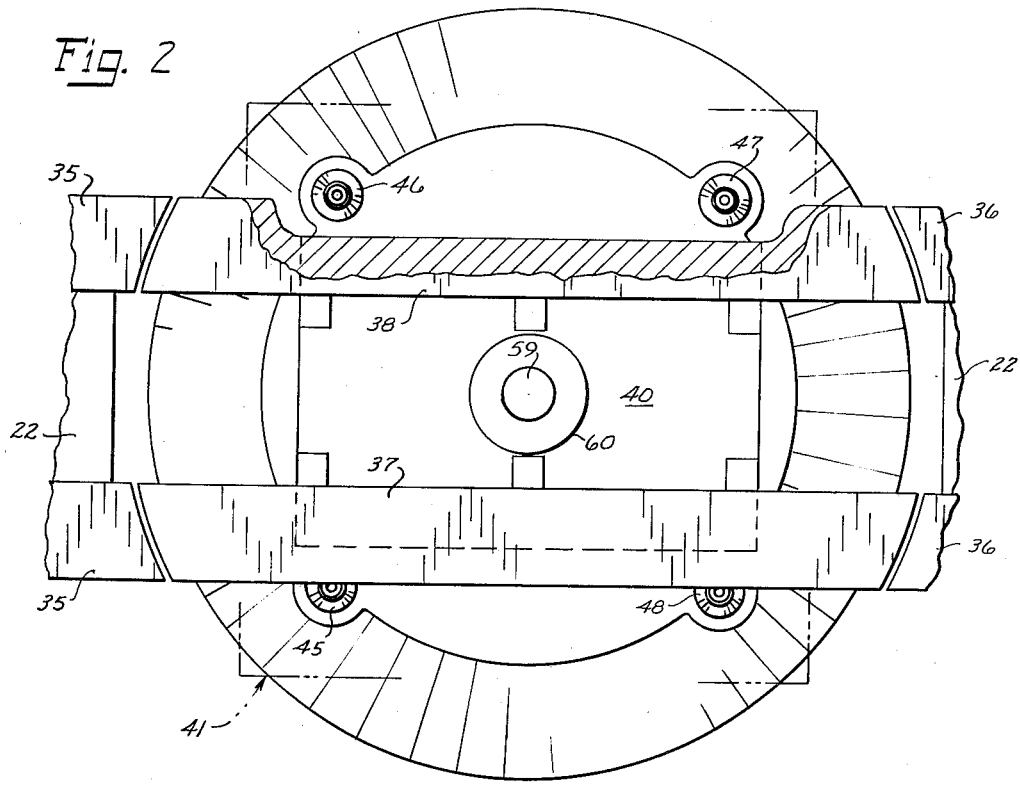
FIG. 2 is an enlarged fragmentary plan view of the index table and axially movable clamp carried thereby, and with certain parts broken away to clearly show the pallet locating pins.
Figure 1:
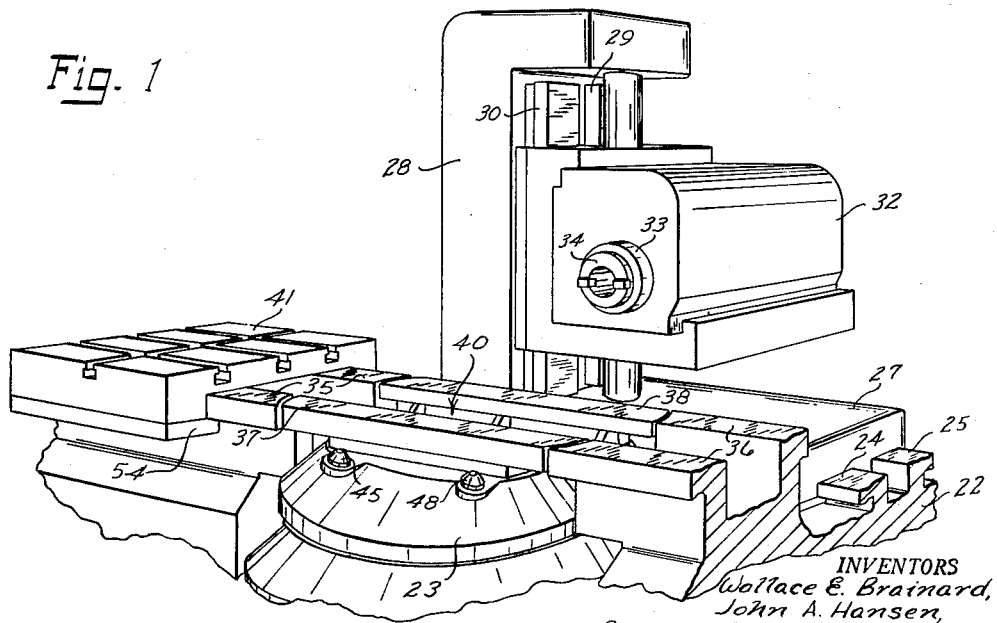
FIGURE 1 is an enlarged fragmentary view in perspective of a machine tool incorporating the improved index mechanism, pallet clamp mechanism, cooperating transfer way surfaces and work carrying pallet.

Referring to the drawings, and particularly to FIGS. 1 and 2 thereof, a machine tool illustrated as incorporating a preferred embodiment of the present invention is a combined milling and drilling machine of the horizontal spindle, bed type. The machine comprises a supporting frame or bed 22 having journalled on its forward portion a selectively indexable rotary table 23, and, spaced rearwardly therefrom, a pair of horizontal, longitudinally extending ways 24 and 25. A base 27 integrally formed with a vertically upstanding column 28 is provided on its underside with way surfaces (not shown) slidably engaging the frame ways 24 and 25 for effecting selective longitudinal column movement relative to the table 23. The upright column 28, in turn, is provided with vertical way surfaces 29 and 30 disposed to be slidably engaged by ways presented by a vertically adjustable spindle carrying head 32. The spindle head 32 is provided with an axially movable quill 33 which, in turn, rotatably supports a tool carrying spindle 34, the latter being interchangeably adapted to carry a milling cutter, boring bar, drill or tap. Power driven transmission mechanisms (not shown) are connected in well known manner to effect longitudinal movement of the column 28, vertical movement of the spindle head 32, axial movement of the quill 33 as well as rotational movement of the tool spindle 34.

For moving a workpiece into operating position upon the rotary table 23, pairs of transfer ways 35 and 36 are spaced on either side of the table in a manner to coact with way surfaces 37 and 38 presented by a pallet clamp 40 supported by the table 23 for vertical, axial clamping movement. Whenever the table 23 is returned to its "home" or starting position, as shown in FIGS. 1 and 2, and the clamp 40 is in upper disengaged position, the clamp ways 37 and 38 are aligned both horizontally and longitudinally with the cooperating pairs of frame ways 35 and 36. With this condition existing, a work carrying pallet, such as the pallet 41, may be slidably advanced along the transfer ways 35 into an operating position upon the clamp ways 37, 38, and above the rotary table 23.

The work pallet 41 is movable along the transfer ways 35 either manually or by a power driven transfer mechanism (not shown). In either case, the work pallet 41 is advanced along the clamp ways 37, 38 until four spaced apart conical recesses formed in the under side of the pallet are in approximate alignment above four frusto-conical pins 45, 46, 47 and 48. The four tapered conical pins 45 to 48 inclusive are secured to the upper face or surface of the rotatable index table 23 in corresponding spaced relationship to the four recesses presented by the underside, or adjacent face, of the pallet 41, only two of the latter 51 and 52 being shown in FIG. 3. At its opposite sides, the work pallet 41 is provided with depending flanged edges to which are fixedly bolted inwardly extending clamp members 54 and 55, respectively provided with four spaced recesses, such as the recesses 51 and 52 shown in FIG. 3. The axially movable pallet clamp 40, in turn, is provided with outwardly extending flanged shoulders 56 and 57 disposed to operatively engage the inwardly extending pallet members. Thus, due to this relationship, axial downward movement of pallet clamp 40 effects a corresponding downward positioning and clamping movement of the work pallet 41 into abutting clamped engagement with the table.

As shown in FIG. 3, an axially movable actuating rod 59 fixedly secured at its upper end to the movable pallet clamp by means of a locking ring 60, extends downwardly through an axially bored opening 62 formed in a downwardly depending tubular bearing sleeve 63 having an upper flanged end secured directly to the central portion of the work table 23 by means of cap screws 64. As the pallet clamp 40 is initially moved downwardly under relatively low power, the coaction between the four tapered pallet recesses, including recesses 51 and 52, with the table locating pins 45 to 48 inclusive effects the required final transverse and longitudinal positioning movement of the pallet, until the recesses are properly seated upon the tapered pins. After this occurs, full downward power is automatically applied to urge the pallet 41 into positive clamping engagement with the table locating pins. It will be readily apparent that, in addition to properly locating the pallet 40 with respect to the table 23, the positive clamping engagement between the coacting recesses and table pins likewise properly positions both the work and pallet in the required horizontal plane. As a prerequisite to effecting selective indexable movement of the rotary table 23, it is necessary that both the pallet 41 and pallet clamp 40 are urged downwardly under full clamping pressure.

As shown in FIG. 3, the rotary table 23 and depending tubular sleeve 63 secured thereto, are urged axially downward to retain the table 23 in locking clamped engagement with a circular table support member 65 that is secured to the supporting frame 22 by means of circumferentially spaced dowels and cap screws. To accomplish this, there is provided a disengageable coupling or clutch 66 comprising an upper coupling member 67 secured to the under side of the table 23, and a cooperating lower coupling member 68 secured directly to the central portion of the stationary table support member 65. As shown in the enlarged fragmentary view, FIG. 12, and the plan view FIG. 11, the lower stationary coupling member 68 is provided with a plurality of radially extending, circumferentially spaced clutch teeth 69 respectively presenting oppositely formed, angular faces 70 and 71. With the table 23 urged downwardly into clamping engagement with the support member 65, the clutch teeth 69 presented by the lower coupling member 68 are disposed to meshingly engage complementary clutch teeth 72 presented by the upper coupling member 67.

The clutch teeth 72 formed in the upper coupling member 67 are provided with angular faces 74 and 75 respectively disposed to coact with the angular faces presented by the clutch teeth of the lower coupling member 68. The angular form of the cooperatively intermeshing clutch teeth 69 and 72 operate to retain the upper coupling member 67 as well as the worktable 23, FIG. 3, secured thereto in a plane perpendicular to the axis of table rotation. Likewise, the angular form of the cooperating clutch teeth respectively presented by coupling members 67 and 68 operate to effect final precise positioning of the upper coupling member 67 and worktable from an approximate selected index position that is effected by an electro-hydraulic index control system, as will hereinafter be explained. To index the coupling member 67 and table 23 from an existing index station to the next selected position, it is necessary that the table 23 be first moved axially upward a distance sufficient that the clutch teeth 72 of the coupling member 67 are completely disengaged from the cooperating clutch teeth of coupling member 68. As soon as the clutch teeth of the coupling members are completely disengaged, as schematically indicated in FIG. 15B, the table 23, FIG. 3, is rotated to the next selected position and stopped automatically within the range of engagement between the angular clutch teeth respectively presented by the disengaged coupling members. As soon as the table is stopped at the next selected index station, it is urged axially downward under low pressure in a manner that engagement between the angular clutch teeth effects the required, slight final positioning movement to the selected position, and the cooperating clutch teeth are moved into direct intermeshing engagement as shown in FIG. 12.

The particular type of clutch coupling 66 illustrated in FIGS. 3, 11 and 12, is provided with a total of 72, radially and angularly formed intermeshing clutch teeth and are adapted for use in the present invention for any number of indexable stations from one to seventy-two inclusive. It will be readily apparent that other coupling members of similar form, and provided with different numbers of cooperating teeth, may be utilized in a similar manner to effect a greatly simplified mechanical index control system according to the principles of the present invention. In the particular embodiment illustrated in FIGS. 1, 3, 11 and 12, a total of eight different index stations are provided.

For effecting selective disengagement and re-engagement of the coupling 66, the table 23 is supported for axial movement in either direction as well as rotatable movement when the coupling is disengaged. To this end, the depending tubular bearing sleeve 63 is supported for rotation within a pair of spaced apart bearings 78 and 79, the outer races of which are fixedly secured within the hollow upper portion of an axially movable guide sleeve 80 that is constrained against rotation. As shown in FIG. 3, the inner race of bearing 78 is retained in abutting engagement between the upper flanged end of the bearing sleeve 63 and a tubular spacer 82; the inner race of bearing 79 in turn being retained in abutting engagement between the lower end of the spacer 82 and a clamp nut 83 threadedly engaging the lower end of the rotatable sleeve 63. The outer races of bearings 78 and 79 are likewise maintained in opposed abutting engagement with an inwardly flanged portion of the axially movable guide sleeve 80. Although the bearings 78 and 79 support the table sleeve 63 for both rotational and axial movement, these bearings are so disposed as to permit a limited amount of radial movement of the sleeve 63 and table 23 relative to the rotational axis thereof. This is done in order that the coaction of the precisely located coupling members 67 and 68 will operate to effect the required, slight radial positioning movement of the table 23 relative to the principal table support member 65 and frame 22. The outer circular surface of the guide sleeve 80 constitutes an elongated sleeve bearing that is slidably constrained for axial movement within a pair of vertically spaced apart cylindrical bearing surfaces 87 and 88 formed within the downwardly extending cylindrical portion 89 of the table support member 65. A circular plate 92 fixedly secured to the lower end of the guide sleeve 80 by cap screws 93 is, in turn, secured to the upper flanged mounting end of a pallet clamp cylinder 94. At its lower end, the clamp cylinder 94 is likewise secured to a transverse plate 95 by means of cap screws 96. At the opposite sides of the pallet clamp cylinder 94, the transverse plate 95 is fixedly secured to the lower flanged ends of a pair of bodily movable table clamp cylinders 98 and 99. A pair of parallel, spaced apart piston rods 103 and 104 respectively associated with the table clamp cylinders 98 and 99 are threadedly and fixedly engaged with the lower depending portion 89 of the table support member 65. As shown in FIG. 3, the lower circular plate 95 is provided with an outwardly extending radial projection 106 having respectively secured thereto upper and lower adjustable stops 107 and 108.

The adjustable upper and lower stops 107, 108 are carried for axial movement between vertically spaced apart switches 110, 111 both of which are carried by an inwardly extending radial mounting plate 112 secured at its outer portion to a vertical web integrally formed with the supporting frame 22. With the table 23 urged downwardly to retain the coupling members 67 and 68 in intermeshing clamping engagement, the lower adjustable stop 108 engages the actuating plunger of the lower limit switch 111. In a similar manner, whenever the table 23 is urged upwardly to the limit of the piston stroke for disengaging the upper coupling member 67 from the lower member 68, the adjustable stop 107 engages the actuating plunger of switch 110. Switches 110 and 111 are interconnected in the electrical control circuit to constitute a portion of the sequencing arrangement.

Inasmuch as the piston rods 103 and 104 are fixedly secured to the depending portion 89 of the support member 65, it will be apparent that the clamp actuating cylinders 98 and 99 as well as the transverse plate 95 secured thereto are moved bodily relative to the piston rods and support member portion 89. For example, to disengage the coupling 66 from the position shown in FIG. 3, it is necessary to so actuate the table clamp cylinders 98 and 99 as to effect axially upward movement of these cylinders and the transverse plate 95, with upward movement being limited by the stroke of the cylinders. At the same time, since the opposite ends of pallet clamp cylinder 94 are fixedly secured to the plates 92 and 95, the upper plate 92 and cylindrical guide member 80 are moved axially upward to effect the required disengaging movement of the table 23 and coupling member 67. For reengaging the coupling 66, after indexing has been effected, the table clamping cylinders 98 and 99 are simultaneously urged downwardly relative to the stationary piston rods 103 and 104. Downward cylinder movement effects a like downward movement of plate 95, cylinder 94, plate 92, and sleeve 80 all of which are fixedly secured together for movement as a single unit.

After the pallet 41 has been urged downwardly into clamping engagement with the four locating pins carried by the table 23, it is retained in clamped engagement therewith irrespective of whether the table index positioning coupling 66 is in engaged or disengaged position. This is due to the fact that the pallet clamp cylinder 94 actually constitutes a fixed link between the upper and lower circular plates 92 and 95 respectively. To effect selective axial movement of the pallet clamp 40, the actuating rod 59 is connected to be moved by a piston rod 116 slidably mounted in the central clamp cylinder 94 for selective axial movement in either direction. As shown in FIG. 3, the piston rod 116 extends from the opposite ends of the cylinder 94 and is fixedly secured at its upper end to a coupling member 117. At its opposite sides, the coupling member 117 is provided with vertically extending keyways disposed to be slidably engaged by keys secured to the circular plate 92 by means of cap screws 119 and 120. Thus, although being restrained against rotational movement, the coupling member 117 is axially movable in accordance with the movement of the actuating piston rod 116.

A lock nut 124 threaded on the central portion of the coupling member 117 cooperates with an upper flanged end 118 thereof in a manner to urge the opposed inner races of thrust bearings 122 and 123 into engagement with an inwardly extending circular flange integrally formed with a cooperating coupling member 127. The coupling member 127, as shown in FIG. 3, is secured directly to a flanged lower end of the pallet clamp actuating rod 59 by means of cap screws. After the work pallet 41 has been moved into downward clamping engagement with the rotary table 23, the actuating rod 59 and cooperating upper coupling member 127 are rotatable relative to the downwardly urged lower coupling member 117 during indexable movement of the rotary table 23.

To that portion of the pallet clamp actuating rod 116 extending below the cylinder 94, as shown in FIGS. 3 and 15B, there is pinned a stop member 124 provided with a pair of oppositely extending radial projections respectively disposed to carry adjustable limit stops 125 and 126. Whenever the work carrying pallet 41 is retained in downward clamping engagement with the table, the adjustable stop 126 engages the actuating plunger of a limit switch 129 secured by means of a flanged mounting bracket 130 directly to the underside of the lower circular plate 95. In a similar manner, whenever the pallet clamp 40 is urged upwardly to permit transfer movement of the pallet 41, the stop 125 engages a limit switch 132 that is secured in a similar manner to the underside of plate 95 by means of a flanged mounting bracket 133. It should be noted that the stop member 124 is restrained against angular or rotational movement by the piston rod 116 which, in turn, is restrained against rotation due to the engagement of the inwardly extending keys with the vertical keyways presented by the lower coupling member 117. Thus, the stops 125 and 126 are always maintained in proper angular relationship to engage the actuating plungers associated with switches 132 and 129.

During machine operation, the pallet clamp mechanism under control of the central pallet control cylinder 94 is operated in coordinated relationship with the table clamp and release mechanism under control of the table control cylinders 98 and 99 to facilitate transfer movement of the work pallet 41 into the working station, as well as selective indexable movement of the pallet 41 to one of a plurality of index stations. For simplicity of assembly, the circular table support member 65 including the depending cylindrical portion 89 integrally formed therewith constitutes the principal supporting member for the entire unitary table clamping and pallet clamping mechanisms. To remove the entire table assembly from the frame 22, the various hydraulic conduits are first disconnected from the hydraulic cylinders 94, 98 and 99; and the circumferentially spaced cap screws and dowels securing the flanged portion of the circular support 65 to the upper cooperating wall of the frame 22 are removed.

After the cap screws securing the table support member 65 to the frame 22 are removed, the entire support 65 is rotated slightly in a manner that the radial stop member projection 106 secured to the lower plate 95 is angularly displaced relative to the upper limit switch 110. Next, the entire circular support member 65 is elevated vertically from the frame to facilitate either adjustment or repair. In a similar manner, after the required adjustments have been effected, the entire unitary assembly carried by the cylindrical support member 65 may be replaced within the frame 22 and the hydraulic conduits reconnected to the three operating cylinders.

For effecting a selective rotational indexing movement of the table 23, the cylinders 98 and 99 are actuated upwardly for the full stroke thereof until the coupling member 67 is moved upwardly a distance sufficient to completely clear the lower positioning coupling member 68, at which time stop 107 actuates switch 110 to initiate the selected index movement. The disengaged relationship between the cooperating teeth respectively presented by the coupling members is shown more clearly, in fragmentary form, in the hydraulic circuit diagram, FIG. 15B. After the coupling 66 is completely disengaged, the table 23 is rotatable in either a clockwise or counterclockwise direction to an approximate location, within the range of angular coupling tooth engagement, relative to the next selected index station. Actually, as will hereinafter be more fully explained, a complete index cycle comprises the steps of automatically disengaging the coupling 66; movement of the table to the approximate final position; reduction of table movement from a rapid to creep rate; stopping of the table; and, re-engagement of the coupling 66 to effect final positioning and clamping of the table 23 in the selected position.

To effect rotational movement of the table 23, a large diameter ring gear 134 is secured directly to the underside of the table 23 by means of circumferentially spaced cap screws 135. As shown in FIG. 3, the lower flanged face of the ring gear 134 is retained in direct abutting engagement with the rearward face of the upper coupling member 67, the latter being secured by means of spaced apart cap screws 136 extending through bored openings in the ring gear 134 to threadedly engage the table 23. The peripheral teeth presented by the table ring gear 134 are disposed to be meshingly engaged by a drive pinion 138 integrally formed with a pinion shaft 139 journalled to rotate about a vertical axis in spaced apart bearings 141 and 142, the outer races of which are constrained against movement within a vertically bored opening formed in the table support member 65. An input driving gear 143 is keyed directly to the lower end of the pinion shaft 139, FIG. 3, and is disposed to be meshingly engaged by a motor drive pinion 144, FIG. 4. The upper hub of the drive pinion 144 is secured by means of a snap ring to the inner race of a bearing 146, the outer race of which is mounted within a vertically bored opening 147 formed in the table support member 65.

The drive pinion 144 is provided with a bore removably keyed to the upwardly extending end of a motor shaft 148 of a selectively rotatable fluid drive motor 150. The fluid drive motor 150 is provided toward its upper end with a flanged mounting plate that is removably secured to a principal support plate 151 which is likewise removably secured directly to a lower face of the table support member 65. A cam drive mechanism 152 connected to be rotated in synchronism with the lower table drive gear 143 is contained within a housing 153 that is removably secured to the mounting plate 151. By means of this arrangement, either the fluid drive motor or the cam mechanism 152 contained within the housing 153 is separately removable from the main mounting plate 151. Likewise, both the fluid drive motor and cam mechanism 152 may be disconnected from the operative relationship shown in FIG. 4 by bodily removal of the support plate 151 from the table support member 65, an opening 155, FIG. 3, being provided in a vertical wall of the frame 22 for this purpose. Further, inasmuch as the mounting plate 151 is fastened directly to the under side of the support member 65, as shown in FIG. 4, bodily removal of the unitary support member 65 from the frame effects a like removal of the fluid motor and index mechanism as a part of this unitary structure.

To facilitate disengagement of the housing 153 from the plate 151, or of the plate 151 from the support member 65, a pilot end 156 is provided on the enlarged upper end of a rotatable creep-stop cam shaft 157, the lower end of which is rotatably supported in a bearing carried by a transverse web 158 formed within the housing 153. With the cam mechanism 152 in operative position, as shown in FIG. 4, the pilot end 156 of the shaft is disposed within a vertically bored opening formed in the lower end of the table driving shaft 139; a disengageable drive pin 159 engaging vertically formed holes respectively formed in the lower end of the shaft 139 and the upper end of the shaft 157. The shaft 157 is of stepped diameter and is disposed to carry on its central intermediate portion a pair of cam plates 160 and 161. As the table drive pinion shaft 139 is connected to be rotated by the fluid motor 150, it will be apparent that the cam shaft 157, as well as cam plates 160 and 161 are connected to be rotated at the same rate of speed. However, due to the ratio between drive pinion 138 and the table ring gear 134, FIG. 3, the table 23 is rotated 45° each time the cam plates 160 and 161, FIG. 4, are rotated through a full 360°. Toward its lower end, as shown in FIGS. 4 and 6, the shaft 157 is provided with a pinion 165 having meshing engagement with a driven gear 166 that is secured to a shaft 167 supported for rotational movement within a pair of spaced apart sleeve bearings, respectively carried by an upper wall of the housing 153 and the centrally positioned transverse web 158. Four vertically spaced apart cam plates 170, 171, 172 and 173 are fixedly secured to the shaft 167 for rotation therewith. The ratio between the drive pinion 165 and driven gear 166 is such that the shaft 167 rotates 45° for each full 360° revolution of the shaft 157. In other words, rotational movement of the shaft 167 and cam plates 170 to 173 inclusive, respectively secured thereto, corresponds to rotation of the rotary table 23, FIG. 3.

As shown in FIG. 4, the cam plates 170 to 173 inclusive are removably secured to the lower end of the shaft 167. To this end, a circular spacer sleeve 176 is fixedly pinned to the shaft 167. The spacer sleeve 176 together with spacer sleeves 177 and 178 are interposed between the cam plates in a manner to space them axially for proper switch actuating relationship, each of the cam plates and spacer sleeves being provided with a pair of axially aligned holes. A pair of cap screws 179 extending through the holes formed in the cam plates and spacer sleeves are threadedly engaged in a pair of tapped holes provided in the lowest cam plate 173.

During rotational movement of the shaft 167, as shown in FIGS. 6, 7 and 9, the cam plates 170, 171 and 172 are respectively disposed to actuate associated binary coded position determining switches 180, 181 and 182. The switches 180, 181 and 182 are secured in spaced relationship within the housing 153 in a manner to be actuated by the arcuately formed portions of the cam plates respectively associated therewith as indicated by the code shown in FIG. 19. Switch 180 is actuated by the arcuate portions of cam 170 whenever the cam and index table are moved to index stations I, II, V or VI. Switch 181 is actuated by the arcuate portion of cam 171 whenever the table is indexably advanced to stations II, III, IV, or V; and switch 182 is actuated by the arcuate portion of cam 172 when the table is moved to stations IV, V, VI or VII. As shown in both FIGS. 6 and 19, none of the switches 180, 181 or 182 is actuated when the table is in its home position, deactuation of all these switches representing the binary code signal for establishing a coincidence circuit to stop indexable advancement of the table in its home position. For indicating that the table and control shaft 167 have been returned to home position, the lower switch 183 is positioned to be actuated by an angular projection presented by the home positioned indicating cam plate 173, as shown in FIGS. 6 and 9. Inasmuch as the switches 180 to 183 inclusively are fixedly secured within the housing 153, it will be apparent that one or another of these switches will be actuated in code fashion each time the table and lower shaft 167 are rotated 45°, i.e. as indicated by index stations I to VII inclusive plus the "H," or home position.

The upper cam plates 160 and 161 are disposed to actuate retractable switches 186 and 187 whenever the binary code switches 180, 181 and 182 are actuated to condition the circuit for stopping table rotation in a particular selected index station. To accomplish this, the switches 186 and 187 are secured to a plate 188 that is journalled for pivotal movement about a shaft 189 carried within the housing 153. Immediately upon the start of any index movement, the plate 188 is automatically pivoted outwardly in a manner to move the switches 186 and 187 radially outward, thereby retracting the actuating rollers from engagement with the periphery of cam plates 160 and 161. The plate is retained in outward position until the required binary switches are actuated to establish a coincidence circuit, permitting inward movement of the plate 188 in a manner that switches 186 and 187 are positioned to reduce the rapid rate to creep rate and stop the table in its approximate selected position.

To condition the control circuit for initiating the next selected index cycle, a plurality of binary coded selector switches are interconnected in series with the binary coded cam actuated switches 180, 181 and 182. As will hereinafter be more fully explained in conjunction with FIG. 16, a selector switch mechanism is connected to effect a coordinate actuation of the associated binary selector switches to establish a condition of anti-coincidence with the corresponding cam actuated binary switches as a prerequisite for initiating the next index cycle.

As shown in FIG. 8, the plate 188 is normally urged to rotate in a counterclockwise direction by means of a spring 192 connected at its opposite ends between a pin carried by the plate and another pin secured within the housing 153. Resiliently biased movement of the plate 188 is limited by engagement of an adjustable stop 194 secured thereto being moved into engagement with an abutment 195 carried within the housing 153.

For purposes of simplification and clarity, the coaction between the resiliently biased retracting plate 188 and the associated actuating cams 160 and 161 is schematically represented in FIG. 6. Although the spring 192 and switch carrying plate 188 are represented as being interconnected in slightly different fashion in FIG. 6, the functions performed thereby are analogous to the structural relationships illustrated in FIG. 8. In both FIGS. 6 and 8, the switches 186 and 187 are urged radially inward by operation of spring 192 in a manner that the actuating rollers thereof operatively engage the cam plates 160 and 161. Whenever the index table is in home position, the actuating roller of creep rate control switch 187 engages the arcuate portion of cam plate 161. At the same time, the actuating roller of stop control switch 186 engages a V-shaped notch 198 presented by cam plate 160.

To retract the actuating rollers of switches 186 and 187 from their resiliently urged engaged position as shown in FIG. 6, a solenoid 202 is connected to effect outward pivotal movement of the plate 188 in opposition to the spring 192. As indicated in FIG. 8, the solenoid 202 is secured within the housing 153 and the axially movable arm 203 thereof is connected to the rightward end of the pivotable plate 188. In FIG. 8, the plate 188 is shown retracted in response to energization of the solenoid 202, as at the start of an index cycle, in a manner that the actuating roller of switch 186 is withdrawn from engagement with the cam plate notch 198 and moved radially a distance sufficient to clear the arcuate periphery of the cam 160.

A visual inspection of FIG. 6 indicates that the arcuate portion of the creep control cam 161 is slightly less than 180°. The actual extent of actuation of the creep switch 187 is approximately 85°, depending upon the direction of rotation and corresponding to rotation of the table 23 and shaft 167 through approximately 11°. The operation of the cams 160, 161 is so coordinated with the binary coded control cams 170, 171 and 172 as to effect a reduction from a rapid index rate to a creep rate approximately 11° from the selected index station, with actual stopping being effected as the roller of stop switch 186 engages the notch 198 formed in the cam 160. As the table approaches a point approximately 22° from the final index position, the plate 188 is resiliently biased to urge switches 186 and 187 radially inward.

At the moment the switches 186 and 187 are urged inward, the associated cams 160 and 161 are displaced approximately 180° from a final stop position, such as that shown in FIG. 6. Immediately thereupon, the roller of switch 186 engages the outer arcuate periphery of cam 160, thus actuating switch 186 to condition the circuit for starting creep movement, as well as stopping of movement upon subsequent deactuation of switch 186. For a slight interval, however, indexing continues at rapid rate until the arcuate periphery of the rotating cam 161 engages the roller of switch 187 to simultaneously reduce the rapid rate to creep rate, and condition the circuit for stopping movement as soon as the roller of switch 186 engages the notch 198, thus deactuating the switch.

As shown in the code, FIG. 19, the creep switch is actuated to control the extent of creep movement whenever the code switches 180, 181 and 182 are actuated in binary code fashion to effect stopping of the table. Likewise, upon arrival of the table at its approximate final position, the stop switch 186 is arranged to be deactuated to effect more accurate stopping.

Since the shaft 157 is rotating eight times as fast as the shaft 167 during indexable movement, the switches 186 and 187 would be actuated eight times, if not retraced, during each 360° revolution of the shaft 167 and table 23, FIG. 3. To prevent excessive actuation of switches 186 and 187, the solenoid 202 is connected to be energized immediately upon the start of any selected index cycle.

To simplify the description, the hydraulic circuit for effecting rotatable indexing movement of the table 23, FIG. 3, is shown in fragmentary schematic form in FIG. 15A, which is adapted to be read in conjunction with the fragmentary circuit shown in FIG. 15B for effecting axial control of the pallet clamp, as well as axial clamping movement of the worktable to its supporting coupling. In other words, the electrical electro-hydraulic circuits respectively shown in FIGS. 15A and 15B are schematically representative of the unitary pallet clamping, table clamping, and table indexing mechanism illustrative of the principal embodiment of the invention as shown in FIGS. 1, 2, and 3, as hereinbefore described.

As shown in FIG. 15A, hydraulic fluid is withdrawn from a sump 206 by means of a pump 207 connected to be driven by an electric motor 208, and is transmitted to a main pressure supply line 209 for the table indexing mechanism. From the pressure supply line 209, hydraulic fluid under pressure is transmitted via a fluid coupling 210 to a hydraulic conduit 211, FIG. 15B, which supplies pressure fluid for actuating the pallet clamp cylinder 94, as well as the table clamp cylinders 98 and 99.

As shown in FIG. 15A, hydraulic fluid under pressure is transmitted from the supply conduit 209 to the conduits 212 and 213 respectively connected to the inlet ports of a clockwise indexing control valve 214, and a counterclockwise control valve 215. With a valve spool 217 of the clockwise valve 214 urged rightwardly by a spring 218, a supply line 219 for the fluid motor 150 is connected via a cannelure 220 in the valve spool 217 to a return line 221. In a similar manner, a valve spool 224 of the counterclockwise valve 215 is shown as being urged leftwardly by a spring 225, thereby connecting a fluid motor supply line 226 via a valve spool groove 227 and a line 228 to the common return line 221. With this condition existing, a shunt circuit from the lines 219 and 226 is established through the de-energized valves 214 and 215 to the lines 221 and 228, thus permitting the necessary slight rotation of the fluid motor 150 during final positioning of the worktable in response to re-engagement of the coupling 66, FIG. 3.

For simultaneously effecting clockwise rotational indexing movement of the worktable 23, FIG. 3, and index control mechanism 152, FIG. 6, a solenoid 230, FIG. 15A, of the valve 214 is energized to effect leftward movement of the valve spool 217 in opposition to the spring 218. Thereupon, fluid under pressure is transmitted from the pressure line 212 via a valve spool groove 231 to the motor supply line 219 for effecting clockwise rotation of the fluid motor 150. The return flow of pressure fluid from the motor 150 continues via line 226, valve spool groove 227, line 228 to the line 221 which is connectable to control the rate of motor rotation. Initially, upon the start of an index movement, the motor 150 is connected to be rotated at a rapid rate. The return line 221 is connected via a predeterminately adjusted rapid rate throttle control valve 233 to a line 234. During rapid indexing movement, a valve spool 237 of a table indexing rate control valve 238 is urged rightwardly by a spring 239, permitting a return flow of fluid from line 234, via a valve spool groove 241, a line 242, and a line 243 connected via a main return line 244 to the sump 206. As the table continues to rotate at rapid rate in a clockwise direction under control of the cam mechanism, FIG. 6, the rate of movement is changed from a rapid to creep rate upon approaching the next selected index station. As soon as the rotating table arrives at a predetermined position relative to its next selected index station, a solenoid 246, FIG. 15A, is connected to be energized to effect leftward movement of the valve spool 237, thus blocking the flow of fluid from line 234 to line 242. Consequently, the return flow of fluid from line 234 continues via a creep rate throttle control valve 247, connected via the line 243 to the main exhaust line 244. Irrespective of whether the motor 150 is being rotated in a clockwise or counterclockwise direction, the rate control valve 238 is automatically operative to control the rate of table movement, with the solenoid 246 being energized to effect a reduction from rapid to creep rate in preparation for accurate stopping of the table in the approximate final selected position. With the worktable rotating in a clockwise direction at creep rate, stopping of table rotation as well as rotation of the fluid motor 150 occurs upon de-energization of solenoid 230; permitting resiliently biased rightward movement of the valve spool 217, and reconnecting the motor supply line 219 to the line 221.

In a like manner, the fluid motor 150 is actuatable to effect counterclockwise table movement, beginning at a rapid rate, with an automatic reduction to a creep rate, and final stopping of the motor being effected at the approximate selected position. To accomplish this, a solenoid 248 of the counterclockwise valve 215 is energized for effecting rightward movement of the valve spool 224, in a manner to connect the pressure line 213, to a valve spool groove 249 connected to the motor supply line 226. With the solenoid 248 of the valve 215 energized to effect counterclockwise motor rotation, the return flow of fluid from the motor continues from line 219, valve spool groove 220, to the line 221 which is sequentially connectable to effect a rapid or creep rate of rotation. The actual rate depends upon whether the return flow of fluid from line 221 continues through the rapid rate throttle control valve 233 alone, or the valve 233 and the feed rate throttle control valve 247 connected in series to provide the reduced creep rate of table movement.

Energization of the solenoid 246 associated with the rate control valve 238, FIG. 15A, is effected as soon as the creep control switch 187, FIG. 6, engages the arcuate portion of the creep control cam 161. Final stopping of the worktable and cam mechanism 152 occurs as soon as the resiliently biased stop switch 186 is engaged by the notch 198 presented by the stop cam 160, to effect de-energization of either the solenoid 230, FIG. 15A, or the solenoid 248, depending upon the direction of table rotation.

As shown in FIG. 15B, the piston rod 116 of pallet clamp cylinder 94 is urged downwardly to retain a pallet in clamped position upon the worktable, and the stop member 124 carried by the piston rod 116 is urged downwardly to actuate the lower switch 129. Likewise, the table clamp cylinders 98 and 99 are represented as being urged upwardly relative to the stationary piston rods 103 and 104, thus retaining the coupling member 67 in upper disengaged relationship to the positioning coupling member 68. The conditions illustrated in FIG. 15B are those existing during indexable movement of the rotary worktable 23, and would correspond likewise to the conditions existing at the moment the table and coupling member 67 are to be urged downwardly to effect re-engagement of the coupling 66 for accurately positioning the table in its next selected index station. To retain coupling member 67 in upper disengaged position during indexable movement, as shown in FIG. 15B, a solenoid 253 is energized to effect upward movement of a valve spool 254 associated with a two position table clamp valve 255. With the valve spool 254 in the upper position as shown, hydraulic fluid under pressure is transmitted from the supply line 211 via a predeterminately adjustable flow control valve 256, and thence through a cannelure 257 in the valve spool to a hydraulic conduit 258. At its opposite end, the conduit 258 is connected to transmit hydraulic fluid under pressure to a pair of inlet ports respectively formed in the upper ends of cylinders 98 and 99, and above pistons 261 and 262 respectively secured to the stationary piston rods 103 and 104. With pressure being applied via conduit 258, the cylinders 98 and 99 are moved axially upward relative to the stationary pistons 261 and 262 which are secured to the lower ends of piston rods 103 and 104. At the same time, hydraulic fluid is exhausted from the cylinders below the pistons 261 and 262 via a line 266 connected through a valve spool cannelure 267 to the line 268 connected to an exhaust line 269. A coupling member 270 is provided to connect the exhaust line 269 to the main exhaust line 244, FIG. 15A, for returning fluid to the sump 206.

After the table and coupling member 67 are rotatably advanced to their next, approximate selected index station, the coupling member 67 is urged downwardly to effect final precise, angular positioning of the rotary table. To accomplish this, a solenoid 272 of the table clamp valve 255 is energized, causing the valve spool 254 to move downwardly and connect the pressure supply from valve 256 via a cannelure 276 to the line 266. Pressure fluid from the hydraulic conduit 266 enters the inlet ports at the lower ends of cylinders 98 and 99, effecting bodily downward movement of these cylinders relative to the stationary pistons 261 and 262. Upon arrival of the table and coupling member in their downwardly positioned clamping engagement with the coupling member 68, the application of full clamping pressure from conduit 266 actuates a pressure switch 275 which is interconnected in a table ready circuit as will hereinafter be more fully described. While the table is being urged to downward clamped position, pressure fluid is exhausted from the upper end of the cylinders 98 and 99 via the line 258 connected through the valve spool groove 273 to the exhaust line 268. After the coupling 66 has been reengaged in response to energization of table clamp valve solenoid 272, the adjustable stop carried by the lower plate 95 actuates the lower sequence switch 111.

As hereinbefore described with reference to FIG. 3, the work pallet 41 is clamped to the table 23 with full clamping pressure during indexable movement thereof. The conditions for achieving this result are illustrated in FIG. 15B in which a solenoid 279 of a pallet clamp valve 280 is shown as being energized to urge a valve spool 281 to its extreme downward position. Likewise, a solenoid 284 associated with a high pressure pallet clamp valve 285 is energized to urge a valve spool 286 rightwardly in opposition to a spring 287. With the valve spools 281 and 286 positioned as shown in FIG. 15B, the piston rod 116 is urged downwardly under full clamping pressure to retain the pallet in properly clamped engagement with the supporting rotary table. Actually, in order to effect the full clamping pressure for the pallet, it is necessary that the solenoids 279 and 284 be sequentially energized, with solenoid 279 operating to effect the initial low pressure positioning clamping, and solenoid 284 being operative to provide full clamping pressure.

It will now be assumed that the table 23, FIG. 3, is positioned in its home position and the pallet 41 is about to be clamped to the upper surface thereof. At the start of the pallet clamping cycle, solenoids 279 and 284, FIG. 15B, are de-energized, and solenoid 306 is energized. Consequently, valve spool 281 is in its extreme upper position while valve spool 286 is urged leftwardly by the spring 287. To start the clamping cycle, solenoid 306 is de-energized and solenoid 279 is energized to urge valve spool 281 downwardly to the position shown in FIG. 15B, thereby connecting the main pressure supply line 211 via a throttle control valve 289, a pressure reducing valve 290, and a check valve 291 to a conduit 292. From the conduit 292, flow of hydraulic fluid at predeterminately reduced pressure continues through a cannelure 293 in the downwardly displaced valve spool 281 to conductors 294 and 295. Since the valve spool 286 of high pressure clamp valve 285 is urged leftwardly by the spring 287 during low pressure positioning movement, the flow of pressure fluid from line 295 is blocked by the valve spool. Thus, the flow of fluid under low pressure continues from the line 294 directly through a line 296 connected to the upper end of the pallet clamping cylinder 94. Admission of low pressure fluid from line 296 to cylinder 94 operates to urge a piston 297 secured to the piston rod 116 downwardly to effect the initial positioning movement of the pallet. As soon as the pallet is properly positioned in response to low pressure downward movement of piston rod 116, the stop member 124 secured to the lower end thereof is moved downwardly to actuate the switch 129, the latter being then connected to effect high pressure clamping engagement of the pallet to the table. Irrespective of whether low or high pressure is being supplied from conduit 296 to the upper end of the cylinder 94, the lower end thereof is connected to exhaust via a conduit 298, and thence through a groove 299 formed in the downwardly displaced valve spool 281 to the exhaust line 269.

Actuation of the switch 129 in response to downward low pressure positioning movement of piston rod 116 and stop member 124, in turn, is connected to effect energization of solenoid 284 associated with the high pressure clamp valve 285, thereby effecting rightward movement of the valve spool 286. The high pressure supply line 211 is then connected via a groove 303 in the valve spool 286 to the conduit 295, and the conduit 296 to urge the piston 297 and piston rod 116 downwardly under full clamping pressure. As full clamping pressure is applied, solenoid 279 of the valve 280 is retained in energized condition, although the low pressure supply from the pressure reducing valve 290 becomes inoperative to effect any clamping function. During this condition, the full clamping pressure available from line 295 is applied through line 296, as well as line 294, and valve spool groove 293 to the line 292, the return flow being blocked by the check valve 291. Hydraulic pressure from line 296 operates to urge the piston 297 and actuating rod 116 downwardly to effect high pressure clamping of the pallet to the worktable. Full clamping pressure, in turn, operates to actuate pressure switch 304 which is operatively interconnected in the table ready circuit as will hereinafter be more fully explained.

To unclamp the work carrying pallet in preparation for the next transfer movement, it is necessary to de-energize solenoids 279 and 284, and simultaneously therewith energize solenoid 306, respectively associated with valves 285 and 280. As this occurs, the valve spool 286 is biased leftwardly by the spring 287, thus blocking the flow of pressure fluid from supply line 211 to hydraulic conduit 295. Likewise, energization of solenoid 306 effects upward movement of the valve spool 281, connecting the low pressure supply line 292 via a valve spool groove 307 to the line 298. As this happens, pressure fluid from the line 298 enters the lower end of the cylinder 94 for urging piston 297 and piston rod 116 upwardly, to unclamp the pallet, and, to move the pallet clamp ways to their upper pallet transfer position. Thereupon, the pallet clamp ways 37 and 38, are displaced from full clamped position shown in FIG. 3, a sufficient distance upwardly to be inparallel alignment with the transfer ways 35, there indicated. Upward movement of the piston rod 116 and the lower stop member 124 in turn actuates switch 132, thereby indicating that transfer movement may take place. At this time, the pallet originally on the rotary table may be advanced from the working station along transfer ways 36, FIG. 1, to the next station, and a different work pallet advanced along ways 35 into operative position above the rotary table for a machining operation on the next workpiece.

The electrical control circuit for effecting a coordinated, sequential operation of the hydraulic control system and the indexing mechanism is shown in schematic form in FIG. 16. As thereshown, electrical energy from a single phase source is supplied through the usual disconnect switch 312, and fuses 314 to energize input conductors 315 and 316. To facilitate the description and reading of the electrical diagram shown in FIG. 16, the horizontal conductors below the horizontal input line 316 have been numbered 317 to 333 inclusive, these numbers constituting a code for identifying the placement of the contact bars associated with the various relays and control solenoids shown in a vertical column toward the right side of the drawing. Irrespective of the various switches and relay contact bars interconnected in the horizontally disposed conductors in FIG. 16, the identifying numbers 315 to 333 inclusive are used to identify the complete horizontal lines as shown.

To energize both the power supply and control circuits, a start button switch 336 is momentarily depressed, thereby completing a circuit from energized conductor 316, through the normally closed contact bar of a stop switch 337 to energize the coil of a relay 338 connected at its opposite terminal to the energized conductor 315. Upon energization of the relay 338 to closed position, a normally open contact bar 338A is moved to closed position completing a holding circuit via the conductor 317 for retaining the relay 338 energized. At the same time, normally open contact bars 338B and 338C are moved to closed position to provide for a flow of current from conductors 316, 315 to energize vertical conductors 339 and 340 respectively.

With the circuit energized for operation, a selector switch 341 is moved to closed position, completing a circuit via the conductor 318 to energize a motor control relay 342 which is then operatively interconnected between the energized control conductors 339 and 340. Upon energization of the relay 342, contact bars 342A and 342B are closed in a manner to complete a control circuit from the energized input conductors 315 and 316 to energize the main drive motor 208. As hereinbefore explained, the motor 208 is connected to drive the pressure pump 207 which is operative to supply fluid under pressure to the hydraulic control system. Likewise, the motor 208 is connected to drive an air compressor 344 which is operative to supply a continuing source of air under pressure for cleaning the coacting surfaces respectively presented by the frusto-conical locating pins and the cooperating recesses, FIGS. 3 and 10, immediately prior to their being moved into engagement.

The compressor 344 is connected by means of an air line (not shown) to provide a constant source of air to a vertically drilled air line 345 formed in the table support member 65 as shown in the fragmentary view, FIG. 10. Whenever the table 23 is in its home position, and is urged downwardly into clamping engagement with the support 65, the vertical air line 345 is in registration with a vertical line 346 formed in the table 23. At the same time, to preclude air leakage, a resilient rubber washer 347, seated in a recess formed concentrically with the line 345, is compressed beneath the underside of the table 23. During indexing, the table 23 is elevated and the underside thereof is moved out of engagement with the resilient rubber washer.

With the table clamped to the support in home position, as shown in FIG. 10, the flow of air from line 346 continues via a horizontal line 350 that is connected by means of lines (not shown) to air outlet ports respectively formed in each of the locating pins 45, 46, 47, and 48, FIG. 2. The construction of each of these four pins together with the cooperating recesses is identical, and is illustrated by the coacting tapered pin 48 and recess 52 shown in FIG. 10. As there shown, the pallet recess 52 is formed in a flanged bushing 351 carried within a bored opening 352 formed in the lower pallet way 55. In a similar manner, the frusto-conical pin 48 is provided with a depending portion of reduced diameter seated within a bored opening 353 formed in the table 23. A cap screw 354 extending through a bored opening in the pin 48 is threaded at its lower end in the table 23. Within its central portion, the cap screw 354 is provided with a bored opening communicating with the horizontal air line 350 in the table 23. Thus, with the table 23 clamped to the support member 65 in a manner that the vertical lines are in registration, air under pressure is transmitted from the line 350 and escapes from the outlet port formed in the upper end of the cap screw 354. As a result, air under pressure is forced from between the cooperating mating surfaces presented by the bushing 351 and pin 48 to thoroughly clean these surfaces as they are being brought into engagement. Thus, any particles of dirt or metal chips that might have lodged on the pins is removed to provide for complete engagement with the recesses.

The control circuit for effecting automatic low pressure positioning, and high pressure clamping of the work pallet 41, FIG. 3, to the table 23, is schematically represented in horizontal lines 319, 320, 321, and 322 in FIG. 16. As there indicated, a control switch 366 may be rotated leftwardly to unclamp the pallet, and rotated rightwardly to clamp the pallet, a legend being shown in associated FIG. 17 for indicating the positions of the three associated contact bars in either clamped or unclamped position.

As shown in FIG. 16 and indicated in the legend, FIG. 17, the control knob associated with the switch 366 is in its rightwardly rotated position, with the contact bar 366A retained in open position and the lower contact bars 366B, 366C retained in closed position. With this condition existing, the pallet is clamped to the associated table under high clamping pressure. It is necessary that the switch 183 be retained in closed position, by movement of the table to its home position, both to permit clamping of a pallet and to energize the unclamping solenoid 306 in preparation for a transfer movement.

It will now be assumed that the table has been returned to home position and is fully clamped to its supporting frame ready to receive a work pallet. With this condition existing, a table ready relay 368, interconnected in horizontal line 333, is energized to indicate that the table is clamped to its supporting frame, and normally open contact bar 368A, line 319, is moved to closed position. With this condition existing, the control knob of switch 366 is rotated to its rightward position, as shown, effecting movement of contact bar 366A to open position, and closure of the two lower contact bars 366B and 366C. Thereupon, a low pressure positioning circuit is completed from energized conductor 339, via conductor 319, closed switch 183, closed contact bar 368A, to conductor 320. This circuit continues through the closed contact bar 366B to energize the low pressure positioning solenoid 279. As soon as the pallet is properly positioned upon the table, switch 129, FIG. 3, is actuated by the adjustable stop 126. Upon actuation of switch 129, the normally open contact bar thereof is closed to complete a high pressure pallet clamping circuit directly from energized conductor 339, conductor 321 to closed lower contact bar 366C.

From the closed contact bar 366C, the high pressure clamping circuit continues via closed switch 129 and the conductor 322 to energize the high pressure clamping solenoid 284 connected at its opposite terminal to the energized control conductor 34. As hereinbefore explained with reference to FIGS. 6 and 15B, solenoid 279 remains energized to retain the valve spool 281 of the low pressure control valve 280 in its downward position. This permits the return flow of fluid from pallet clamping cylinder 94 via the return line 298 and valve spool groove 299 to the main exhaust line 269. With high pressure clamping solenoid 284 energized, pressure fluid through hydraulic conduits 295 and 296 effects high pressure clamping of the piston rod 116, thereby effecting closure of pressure switch 304, to in turn effect closure of the contact bar associated therewith, as shown in FIG. 16. With the contact bar of pressure actuated switch 304 moved to closed position, a circuit is then completed from the closed contact bar of switch 129 to energize the coil of a pallet ready relay 369 connected at its opposite terminal to energized conductor 340. Energization of pallet ready relay 369 to closed position effects closure of normally open contact bar 369A interconnected in horizontal conductor 326, to permit the start of a table index cycle.

To initiate an index cycle, with indexing taking place in either a clockwise or counterclockwise direction as selected, there is provided an index cycle start switch 370 having contact bars 370A to 370D inclusive, respectively interconnected in horizontal conductors 325, 326, 329 and 330. A resiliently returnable control knob for the switch 370 is rotatable either rightwardly or leftwardly to effect clockwise or counterclockwise indexing movement respectively, as indicated on the table index switch legend, FIG. 19. As shown in FIGS. 16 and 19, with the arrow on the control knob for switch 370 positioned vertically, the four contact bars are in disengaged position with respect to conductors 325, 326, 329 and 330.

As a prerequisite to actuating switch 370 for starting a selected index cycle, a rotatable control knob 373 of an index selector switch mechanism 374 is rotatably positioned to condition the control circuit for effecting movement to the next selected index station. As shown in FIG. 16, the selector switch knob 373 is provided with indicia indicated as "H," and I to VII inclusive respectively corresponding to the various index stations provided in this embodiment of the invention, as hereinbefore explained. As schematically indicated in FIG. 16, the control knob 373 is connected to effect a simultaneous, co-ordinated actuation of three index selector switches 375, 376 and 377.

Each of the switches 375, 376, and 377 is provided with a pair of coordinately movable contact bars. With the selector index knob 373 rotated to the "H," or home position, the upper contact bars 375A, 376A, 377A of the respective switches are in open position, as indicated on the index selector switch code shown in FIG. 18. As there indicated, the upper contact bars 375A, 376A and 377A are coordinately actuatable to closed position in predetermined coded fashion, depending upon the selected rotatably adjusted position of switch knob 373. Whenever one or another of the upper contact bars 375A to 377A inclusive are moved to closed position, the corresponding lower contact bars 375B to 377B are moved to open position.

Likewise, whenever all of the upper selector switch contact bars are in open position, as shown in FIG. 16, corresponding to the home position of switch knob 373, the lower contact bars 375B, 376B and 377B are in closed position. With this condition existing, providing the rotary table has already been returned to its home position, a binary coincidence circuit is established from energized conductor 339, and horizontal conductor 324 to energize a binary coincidence relay 380. As hereinbefore explained, the contact bars of binary code position indicating switches 180, 181 and 182 are disposed to be coordinately actuated by the associated plate cams 170, 171 and 172, FIG. 6. Whenever the table is in its home position, therefore, the actuating rollers associated with switches 180, 181 and 182 are not engaged by the arcuate peripheries of the plate cams, and the contact bars of these switches are in normally closed position, as shown in FIG. 16. Thus, the binary coincidence circuit to energize binary coincidence relay 380 for stopping table movement in its home position is established as soon as the contact bars associated with switches 180 to 182 inclusive are returned to normally closed position, thereby establishing coincidence with the lower closed contact bars 375B to 377B inclusive. Energization of the binary coincidence relay 380 upon completion of a coincidence circuit via conductor 324 effects movement of a normally closed contact bar 380A, line 327, to an open position, thereby interrupting this circuit to permit de-energization of the retracting solenoid 202. Simultaneously, normally open contact bar 380B, line 333, is closed thus conditioning the circuit therethrough for subsequent energization of table ready relay 368.

Energization of the relay 380 provides a signal for initiating a reduction of speed to creep rate and stopping of the table within a range in which final positioning may be effected; and, is necessary to effect subsequent energization of the table ready relay 368 upon final arrival at the selected station. Conversely, de-energization of relay 380 conditions the indexing control circuit for the next index cycle, which is then initiated by manually rotating the index cycle start switch 370 in either selected direction. It will be apparent that de-energization of the binary coincidence relay 380 is effected whenever the circuit is interrupted through conductor 324, or through the conductor 324 and one or another of the conductors 323, 323A, 323B. Before any indexing movement may be effected, it is necessary to rotate the selector control knob 373 to a position in which the indicia shown thereon do not coincide with the then existing position of the rotary table and work pallet. In the instant case, for example, with the selector knob 373 in the "H" position, binary coincidence relay 380 is energized, and no indexing movement will take place even though cycle start switch 370 is actuated.

A principal advantage of the present invention is that an indexing movement may be effected in either direction from an existing index station to any selected index station, skipping any of the nonelected index stations. Thus, it is not necessary that indexing be sequentially effected in a step by step manner.

To facilitate the description, only one particular selected index cycle will be described in detail. This is deemed sufficient to explain the principles involved in establishing anti-coincidence through the horizontal conductor 324 to effect de-energization of relay 380, and thereby condition the entire control circuit for a particular selected index cycle. It will now be assumed that the worktable is to be advanced from its home position to its second (II) index station, located 90° from the home position. To accomplish this, the selector knob 373 is rotated to the second (II) position in which, as shown in FIG. 18, the upper contact bars 375A and 376A are moved to upward closed position completing shunt circuits from conductors 323 and 323A respectively connected at their opposite ends to central portions of the conductor 324. At the same time, the lower contact bars 375B and 376B are moved to upper open position, immediately establishing anti-coincidence with associated position indicating switches 180 and 181 to interrupt the coincidence circuit and effect de-energization of the relay 380. Whenever the table is to be advanced to the second (II) station from any previous existing index station, as shown in FIGS. 16 and 18, the upper contact bar 377A of switch 377 remains in open position, and the lower contact bar 377B thereof remains in closed position in coincidence with the cam actuated position indicating switch 182.

In the particular index cycle being used for illustrative purposes, the switch knob 373 is rotated to the second (II) position, de-energizing relay 380, which in turn effects closure of contact bar 380A in line 327, as well as movement of contact bar 380B, line 333, to open position. With the table ready relay 368 in line 333 de-energized upon opening of contact bar 380B, a contact bar 368B interconnected in horizontal conductor 326 is thereby moved to its normally closed position to condition the circuit for either clockwise or counterclockwise indexable movement from the home position to the second station. With these conditions established, it is further assumed that the pallet is clamped to the rotary table to energize pallet ready relay 369, line 321, thereby effecting closure of normally open contact bar 369A interconnected in series with normally closed contact bar 368B in line 326. To initiate the selected index movement from home position to the second station, the control knob associated with cycle start switch 370 is then rotated in a clockwise direction to close the contact bars 370B, line 326, and 370D, line 330, thus beginning the complete index cycle. Closure of the contact bar 370B completes a circuit from conductor 339 via conductor 326 and the closed contact bar 369A of the energized pallet ready relay and the normally closed contact bar 368B to energize an index cycle start relay 382.

Energization of the index start relay 382 immediately effects closure of normally open contact bar 382A interconnected in the conductor 327. Inasmuch as the table ready relay 368 is de-energized, a circuit is then established from conductor 327 via the closed contact bar 382A and the normally closed contact bar 380A of the table ready relay to energize the retracting solenoid 202, FIGS. 6 and 16. Upon energization of solenoid 202, the support plate 188 is moved outwardly to withdraw the actuating rollers of switches 186, 187 from engagement with the associated cams 160, 161.

Retraction of creep switch 187 from engagement with cam 161, FIG. 6, simultaneously effects closure of the upper switch contact bar 187A and movement of the lower contact bar 187B to an open position. Movement of contact bar 187B to open position interrupts a circuit to preclude premature energization of solenoids 246 and 272. At the same time, upon retraction of the actuating roller of stop switch 186 from the notch 198, the contact bars thereof are retained in deactuated condition; i.e., contact bar 186A remains in normally open position and contact bar 186B remains in normally closed position. Consequently, a circuit is established from conductor 327, via closed contact 382A, conductor 328, the closed upper contact bar 187A to energize the table unclamping solenoid 253, the latter being shown both in FIGS. 15B and 16. As hereinbefore explained, energization of solenoid 253 effects upward movement of valve spool 254, connecting the pressure line 268 to effect a corresponding bodily upward movement of the table clamping cylinders 98 and 99.

As soon as the table is in fully disengaged or unclamped position, the stop member 106 actuates the upper limit switch 110 to complete a circuit for effetcing the desired clockwise rotation at a rapid rate. This is shown more clearly in FIG. 16, the clockwise rotation circuit being completed from conductor 327, closed contact bar 382A, conductor 328 to the now closed upper contact bar 187A of table creep switch 187. The circuit continues from closed contact bar 187A via the closed contact bar of table unclamp switch 110, and thence via the conductor 330 and through the lower closed contact bar 370D to energize the clockwise rotation solenoid 230. With the solenoid 230, FIGS. 15A and 16, energized, the pressure line 212 is connected to effect rapid rotation of the fluid motor 150, a rapid rate control circuit being then completed via the valve spool groove 241 of the de-energized rate control valve 238. Table indexing movement continues in a clockwise direction at rapid rate until the cams 170 and 171 shown in FIG. 6 are rotated a sufficient distance to actuate both of the binary code position indicating switches 180 and 181, according to the code in FIG. 20.

As soon as binary switches 180 and 181 are actuated by engagement with the arcuate peripheries of cams 170 and 171 respectively, the contact bars of switches 180 and 181, FIG. 16, are moved upwardly into bridging engagement with conductors 323 and 323A respectively. With this condition existing, a coincidence circuit is immediately established from the energized control conductor 339, conductor 324, upwardly moved contact bar 180 to conductor 323; this circuit continues via closed contact bar 375A, and upwardly closed contact bar 181 to conductor 323A. From conductor 323A, the coincidence circuit then continues through upwardly closed contact bar 376A, downwardly closed contact bar 182 and contact bar 377B to energize the binary coincidence relay 380. Energization of coincidence relay 380, in turn, effects movement of contact bar 380A, line 327, to open position to de-energize the retracting solenoid 202. At the same time, normally open contact bar 380B, line 333 is moved to closed position. Upon de-energization of retracting solenoid 202, FIGS. 6 and 16, the switch support plate 188 is biased inwardly by means of spring 192 in a manner that the actuating rollers associated with switches 186 and 187 are moved inwardly to a position for engaging the peripheries of plate cams 160 and 161. At this particular time, since the table has not yet arrived at the selected station, the plate cams 160 and 161 are displaced approximately 180° from their positions shown in FIG. 6. Thus, the creep switch 187 is not immediately actuated, since the arcuate portion of the cam 161 has not yet advanced a sufficient distance to do so.

The actuating roller of stop switch 186 is, however, immediately engaged by the arcuate periphery of cam 160 to condition the circuit for reduction from a rapid to a creep rate, which is initiated as soon as cam 161 rotates a distance sufficient for the arcuate portion thereof to engage the actuating roller of creep switch 187. In the interval before this occurs, actuation on stop switch 186 effects closure of the upper contact bar 186A and movement of the lower contact bar 186B to an open position. In this interval, clockwise rotation of the table is continued at rapid rate while an overlapping by-pass circuit is completed from conductor 327, closed contact bar 382A, conductor 329, closed contact bar 186A, and thence via the closed contact bar of switch 110 to the conductor 330. From the conductor 330, this circuit continues through the closed contact bar 370D of manual cycle start switch 370 to retain the clockwise rotation solenoid 230 energized. Movement of the lower stop switch contact bar 186B to open position, prevents premature energization of clamping solenoid 272, FIGS. 6 and 16, upon subsequent closure of creep switch contact bar 187B. Upon a slight further rotation of cam 161, the arcuate portion thereof engages the actuating roller of creep switch 187 which is then actuated to initiate creep rate. The creep rate control circuit is completed from conductor 339, conductor 331, the now closed contact bar 187B of actuated switch 187 to energize the creep rate control solenoid 246. However, movement of upper contact bar 187 to open position has no effect on solenoid 230 which remains energized due to the previously established overlapping circuit through the closed contact bar 186A.

Clockwise rotation of the worktable to the approximate selected station then continues until the cam 160, FIG. 6, is rotated a distance sufficient to permit engagement of the actuating roller for stop switch 186 with the notch 198.

Deactuation of stop switch 186 by engagement of the roller associated therewith with the cam notch 198, effects immediate movement of the upper switch contact bar 186A to open position to stop movement in the approximate selected position. Thereupon, the circuit from conductor 329 is interrupted to effect de-energization of the clockwise control solenoid 230. As hereinbefore explained with reference to FIG. 15A, de-energization of control solenoid 230 permits resiliently biased rightward movement of valve spool 217 to stop clockwise motor rotation. At the same time, closure of the lower contact bar 186B, FIG. 16, completes a circuit from conductor 331, closed contact bar 187B of actuated creep switch 187 to conductor 332 for energizing the table clamp solenoid 272. As soon as this happens, the valve spool 254 of the table clamp valve 255 is moved downwardly to effect the flow of pressure fluid from pressure line 211 via valve spool groove 276 to the hydraulic line 266. The flow of fluid from line 266 continues to the lower ends of clamp cylinders 98 and 99, effecting bodily downward movement of these cylinders to urge the table and associated coupling 67 axially downward into clamped engagement with the stationary coupling 68. As this occurs, the cooperating clutch teeth presented by coupling members 67 and 68 cooperate to effect the required slight angular displacement of the table to its final selected second (II) position.

Movement of the table and coupling member 67 downwardly under full clamping pressure operates to effect actuation of the pressure switch 275, FIGS. 15B and 16, thereby moving the contact bar of pressure switch 275 to closed position as shown. At the same time, with the table in fully clamped position, the stop member carried by lower plate 95 engages the actuating plunger of switch 111 to effect closure of its contact bar, and effecting energization of the table ready relay 368. With the table advanced to its second station and the table ready relay 368 energized, the normally open contact bar 368A associated therewith, line 319, is moved to closed position. Likewise, a normally closed contact bar 368B, line 326, is moved to open position to prevent premature energization of the table index start relay 382. Inasmuch as the table is now displaced 90° from its home position, the home position indicating cam 173 shown in FIG. 6 is moved out of engagement with the actuating roller of home position switch 183. Thus, the contact bar of switch 183 is moved to open position as shown in FIG. 16 to preclude energization of the pallet unclamping solenoid 306 until the table is again returned to its home position.

In a modified form of the invention, as shown in

FIGS. 13 and 14, there is provided a modified form of disengageable coupling adapted to fixedly position the worktable 23 in a selected indexed position upon the table support member 65. As indicated in FIG. 14, the disengageable coupling comprises four pins 385 to 388 inclusive secured to the table support member 65 and presenting frusto-conical upper ends adapted to meshingly engage complementary internally tapered surfaces presented by bushings 391 to 398 inclusive secured to the underside of the indexable worktable 23. Whenever the table 23 is urged downwardly into clamping engagement with the table support member 65, four alternate ones of the bushings 391 to 398 inclusive are urged into positioning, meshing engagement with the four spaced apart tapered pins 385 to 388 inclusive.

As indicated in FIG. 14, for example, the tapered pins 385 to 388 inclusive are respectively engaged by bushings 391, 393, 395 and 397. Assuming that this is the home position for the worktable 23, indexable advancement of the table in a clockwise direction to the first station will effect engagement of the four tapered pins with bushings 398, 392, 394 and 396. In a similar manner, the table can be selectively indexed to any one of eight stations in which the tapered pins will be operatively engaged by four of the associated bushings secured to the worktable.

Inasmuch as the construction and coaction between all of the support member pins and table bushings is identical, only two of these members will be described in detail. As shown in FIG. 13, the tapered pin 385 is provided wtih a lower end 401 of reduced diameter that is fitted within a vertically bored hole 402 formed directly in the table support member 65. The cooperating bushing 391 is likewise seated within a bored opening 403 formed in a circular ring member 404 that is, in turn, secured directly to the worktable 23. As shown in FIG. 13, the circular ring member 404 is retained in abutting engagement against the underside of ring gear 134, and is secured thereto by means of a plurality of circumferentially spaced cap screws 405 extending through enlarged holes formed in the ring gear 134 and threadedly engaged in the worktable 23.

As indicated in FIGS. 13 and 14, the coaction between the cooperating frusto-conical pins and cooperating bushings is such that axial upward movement of the table 23, as hereinbefore described, with reference to FIG. 3, effects a complete disengagement to permit selective rotational indexing movement of the table. Upon arrival of the table 23 at its next selected station, downward movement thereof in response to corresponding downward movement of the support sleeve 80 operates to effect the final, slight angular positioning movement required due to the engagement of the internally tapered table bushings with the four stationary pins carried by the support member 65. The tapered pins 385 to 388 inclusive and the cooperating internally tapered bushings 391 to 398 inclusive constitute a modified form of positioning coupling, such as the disengageable coupling 66 represented in the principal embodiment of the invention shown in FIG. 3.

In a further modified form of the invention, as shown in FIG. 5, there is provided a novel, simplified form of eelvating mechanism for releasably clamping a worktable to a cooperating support member in a selected index position. Although shown in conjunction with a clutch type positioning couplings such as the disengageable coupling 66 in FIG. 3, the axially movable elevating mechanism shown in FIG. 5 is adapted to be utilized with equal advantage in conjunction with the cooperating pin and recess coupling shown in FIG. 5. As shown in FIG. 5, a circular flanged table support member 408 is secured directly to the machine frame 22 by means of circumferentially spaced cap screws 410. The table support member 408 is integrally formed with a downwardly depending tubular portion 409 having a central portion adapted to constitute a vertically disposed cylinder 411. The cylinder 411 is delimited by the opposed, inwardly extending ends of an upper flanged, sleeve bearing 414 and a lower sleeve bearing 415. A flange integrally formed with the depending upper sleeve bearing 414 is secured directly to the table support member 408 by cap screws 416; the lower sleeve bearing 415 is fitted within an internally formed circular recess presented toward the lower end of the depending portion 409 of the support member 408, and is clamped therein by means of a circular clamp ring 417 secured to the depending portion by cap screws 418. The upper and lower sleeve bearings 414, 415 are provided with internally formed cylindrical bearing surfaces disposed to support an elongated tubular support sleeve 420 for both axial and rotatable movement. Toward its central portion, the tubular support sleeve 420 is provided with an enlarged circular portion constituting an integrally formed piston 421 slidably constrained within the cooperating cylinder 411. A selectively indexable rotary table 422 is secured to the upper end of the axially and rotatably carried tubular support sleeve 420 by means of cap screws 423. The table supporting sleeve 420 is provided with a hollow central portion 424 extending throughout its length and through which may be connected a pallet clamping mechanism (not shown) in a manner similar to the pallet clamping mechanism shown in FIG. 3. As shown in FIG. 5, a work support 425, presenting the usual T-slots, is secured by cap screws 426 directly to the upper face of the rotary table 422 for indexable movement therewith.

An upper disengageable coupling member 430 and ring gear 431 are secured in adjacent abutting relationship directly to the underside of the rotary table 422 by cap screws 432. The upper coupling member 430 is provided on its lower face with spaced apart, radially formed clutch teeth adapted to coact with complementary clutch teeth presented by a lower coupling member 435 that is secured directly to the central portion of the table support member by means of circumferentially spaced dowels and cap screws 436. The upper movable coupling member 430, and the lower stationary coupling member 435 are disposed to coact in identical fashion to the disengageable coupling 66 shown in FIG. 3. By means of this arrangement, therefore, the table 422 and upper coupling member 430 may be elevated vertically into a position of disengagement relative to the lower coupling 435 to permit selective rotatable indexing movement to the next approximate selected index station. At that time, downward movement of the table 422, within the range of angular clutch teeth respectively presented by coupling members 430 and 435, operates to effect precise angular positioning of the table to the next selected index station.

To effect indexable movement of the table 422, the ring gear 431 is meshingly and slidably engaged by a pinion 138A integrally formed with a drive shaft 139A rotatably supported in bearings 141A and 142A, the outer races of which are constrained within a vertically bored opening formed in the principal table support member 408. For transmitting power to the shaft 139A, a driven gear 143A secured to the lower end thereof is operatively engaged by the motor drive pinion 144, FIG. 4, secured to the fluid motor shaft 148. The cooperating shaft 139, and gear 143 shown in FIG. 4 are identical both in configuration and function to the shaft 139A and gear 143A shown in FIG. 5. Thus, whenever the table 422 is elevated upwardly to disengage the coupling member 430 from the stationary coupling member 435, the drive pinion 138A is rotatable either in a clockwise or counterclockwise direction to effect a selective indexable movement of the table 422. At the completion of a required indexing movement, as hereinbefore explained, the table 422 is again urged downwardly in a manner that engagement of the coupling 430 with the stationary coupling member 435 operates to effect the required final slight angular table displacement to its final selected position.

To retain the table 422 and upper coupling member 430 in downwardly clamped position, as shown in FIG. 5, hydraulic fluid under pressure is admitted from a line 438 to an annular recess 439 thus urging the piston 421 downwardly within its cooperating cylinder 411. As this occurs, fluid is exhausted from an annular recess 442 formed beneath the piston via an angular drilled line 443 and a horizontally drilled line 444, respectively formed in the axially movable tubular support member 420. From the horizontal line 444, the exhaust continues to an annular groove 447 formed toward the central part of the piston 421 and thence out a line 448 connected to exhaust. With the table in clamped position as shown, a stop member 453 secured to the underside of the axially movable support sleeve 420 is positioned to engage the actuating plunger of a switch 111A, this switch 111A functioning in identical fashion to a similar sequence type switch 111 shown in FIG. 16, as hereinbefore explained. Movement of the table 422 to upper disengaged position effects corresponding movement of the stop member 453 to actuate a switch 110A. The switches 110A and 111A are secured to an angular bracket 454 that, in turn, is secured directly to the outer periphery of the depending portion 409 of the principal table support member 408.

To elevate the support 420 and table 422 to unclamped position, the line 438 is connected to exhaust, and the line 448 is connected to receive fluid under pressure. With this condition existing, hydraulic fluid from the line 448 enters the annular groove 447 and then flows through lines 444, 443 to the lower recess 2. The piston 21 integrally formed with the support 20 is then displaced upwardly a distance sufficiently for the lower end of the piston to overlap an annular groove 456 formed in the cylinder wall. This condition is illustrated more clearly in the fragmentary view, FIG. 5A, in which the lower recess 442 is opened to an annular exhaust groove 456, and the upper pressure annular groove 447 is moved partially out of registration with the inlet pressure line 448.

Inasmuch as the annular cylinder groove 456 is connected to an exhaust line 457, it will be apparent that an equalized throttle action will occur between the exhaust groove 456 and the pressure inlet groove 447. The condition is such that the piston 421 is elevated a distance sufficient that the volume of fluid exhausted via line 457 is approximately the same as the volume of fluid under pressure admitted from line 448 to the annular groove 447. Any tendency of the piston 421 to rise above a predetermined distance will further restrict the flow of incoming pressure fluid from line 448 and, likewise, permit a greater volume of fluid to be exhausted from the groove 456 to line 457. Thus, the extent of vertical movement of the sleeve 420 is limited and, during rotational movement thereof, the piston is supported upon a cushion of fluid under pressure within the lower recess 442, FIG. 5A. In addition to limiting vertical movement of the sleeve 420 and table 422, this arrangement obviates the necessity for any antifriction thrust bearings to limit the extent of vertical movement, as well as the necessity for antifriction bearings to rotatably support the tubular sleeve 420.

The tubular table support 420 is loosely fitted for axial and rotatable movement within the sleeve bearings 414 and 415 in a manner to permit a slight radial movement during final positioning. Likewise, the cylinder 411 is disposed to constrain the integrally formed piston 421 for a slight radial movement, an annular groove 458 formed in the cylinder wall being connected to the exhaust line 457 to permit exhausting any fluid flowing from the upper recess 439 as pressure is applied to the upper line 438 during clamping. As hereinbefore explained with reference to FIG. 3, the disengageable coupling 66 there shown is operative to effect the required radial positioning of the table 23, as well as to support the table and pallet in the proper horizontal plane. In a similar manner, the cooperatively intermeshing clutch teeth respectively presented by the coupling members 430 and 435, FIG. 5, are operative to effect the required radial and horizontal positioning movement of the table 422 in a selected index station. To preclude oil leakage, since the tubular sleeve 420 is fitting for a slight radial movement O rings 461 and 462 are respectively carried in annular grooves formed in the upper sleeve bearing 414 and lower sleeve bearing 415.

The hydraulic circuit for effecting disengageable clamping of the table 422, FIG. 5, is shown in the fragmentary circuit diagram in FIG. 15C. As there indicated, the clamping and unclamping circuit in FIG. 15C is adapted to be read in conjunction with the fragmentary hydraulic circuit shown in FIG. 15A which, as hereinbefore explained, is connected to effect selective indexing movement of the table after it has been elevated to unclamped position. As shown in FIG. 15A, fluid from the pressure line 209 is connected via a coupling 210 to supply pressure fluid to a supply line 464, FIG. 15C. A pressure fluid exhaust line 465 is likewise connected via a fluid coupling 270 to the main exhaust line 244, FIG. 15A.

For retaining the couplings 430 and 435, FIG. 5, in clamped engagement, a solenoid 272A is energized to effect downward movement of a valve spool 467 associated with a table clamp valve 468, as shown in FIG. 15C. Thus, fluid under pressure is transmitted from supply line 464, via a valve spool groove 469 to the clamping pressure supply line 438. As soon as the table is fully clamped, switch 111A is actuated, and pressure switch 275A is actuated. With the table in clamped, index position, fluid is exhausted from the lower end of the cylinder 411 via the line 448 connected through a valve spool groove 470 to the exhaust line 465. For urging the piston 421 upwardly to facilitate indexing, the solenoid 272A is deenergized and an unclamping solenoid 253A is energized. As soon as the solenoid 253A is energized, the valve spool 467 is urged upwardly, connecting the pressure supply line 464 via a valve spool groove 472 to the line 448. As this occurs, fluid from the upper end of the cylinder is exhausted from the line 438 which is then connected via a valve spool groove 473 to the exhaust line 465. At the same time, during unclamping, a reduced volume of pressure fluid is exhausted from the lower recess 442 and the annular groove 456, FIG. 5, to the line 457 which is connected to return fluid to the main sump 206 by means of a line (not shown). The pressure switch 275A, as well as solenoids 253A and 272A, FIG. 15C, function in identical fashion to the pressure switch 275, and solenoids 253, 272 which are shown in FIG. 16, as hereinbefore fully described. Likewise, the binary coded selector switch mechanism and cam actuated binary switches, FIGS. 6 and 16, function as hereinbefore described to effect selected indexing movement of the modified rotary table clamping mechanism shown and described in connection with FIGS. 5, 5A and 15C.

From the foregoing detailed explanation of the operation of the exemplifying index mechanism and control system herein set forth as a practical embodiment of the present invention, it will appear that there has been provided a greatly simplified improved machine tool index mechanism and actuating positioning mechanism therefor that is especially adapted for convenient operation and that may be adjusted and maintained with facility.

Although the illustrative embodiments of the invention have been described in considerable detail for the purpose of fully disclosing a practical operative structure by means of which the invention may be practiced, it is to be understood that the particular apparatus herein described is intended to be illustrative only and that the various novel characteristics of the invention may be incorporated in other structural forms without departing from the spirit and scope of the invention as defined in the subjoined claims.

The principles of this invention having now been fully explained in connection with the foregoing description, we hereby claim as our invention:

1. In a machine tool provided with a frame having a bored opening, an indexable table having a depending circular portion journalled to rotate in the bored opening formed in said frame, said table being provided with an axial bored opening extending therethrough and through the depending circular member, a pair of cooperatively intermeshing disengageable coupling members respectively secured to said frame and said table disposed to cooperate for retaining said table in a selected position of indexable adjustment, said coupling members being provided with complementary angularly formed teeth in a manner that the intermeshing engagement therebetween operates to effect final indexable positioning movement of said table, first power operable means connected to move said table axially in one direction for disengaging said coupling members, said means being reversibly operative upon completion of an indexing movement to move said table axially to re-engage said coupling members for effecting final angular indexable positioning movement of said table, second power operable means including an indexing control system connected to rotatably advance said table a predetermined distance whenever said coupling members are disengaged, a clamp member movably carried by said table, said clamp member provided with outwardly extending flanges presenting way surfaces, a clamp actuating member extending through the bored opening in said table being pivotably interconnected with said clamp member, a work carrying pallet having spaced apart depending flanges disposed to engage the flanges presented by said clamp member, said pallet and said clamp member being releasably engageable to preclude relative axial movement therebetween, and third power operable means connected to move said actuating member for urging said clamp member into engagement with said work pallet and releasably clamping said pallet to said table.

2. A presettable control system for an indexable member comprising a member to be moved to a selected position; a rate change drive mechanism connected to drive said member a predetermined distance; a cam control mechanism connected to be driven in synchronism with said member; said cam control mechanism comprising a creep cam, a stop cam, and a plurality of binary coded cams; a creep control switch and a stop switch carried in switch actuating relationship to the peripheries of said creep cam and said stop cam; a movable retracting plate disposed to carry said creep switch and said stop switch, said plate being retractable to move the switches carried thereby out of peripheral engaging relationship with said creep and stop cams; a plurality of binary coded switches fixedly carried in position to be coordinately actuated by said binary coded cams; a selector mechanism connected to select the next indexed position of said table; a plurality of binary coded selector switches connected to be coordinately actuated by said selector mechanism, said selector switches being actuatable to positions of anti-coincidence with respect to said cam actuated switches as a prerequisite to effecting indexing movement of said member; a control system including a cycle start switch and circuit means including a source of power actuatable to initiate indexable movement of said table whenever anti-coincidence exists between said cam actuated switches and said selector switches, said control system being operative upon actuation of said start switch to retract said plate and to activate said rate change drive mechanism for starting indexing at a rapid rate; said control system being operative to release said plate from retracted to non-retracted position upon rotatable advancement of said binary coded cams to positions for so actuating said binary coded switches as to restore coincidence with said binary coded selector switches; said control system being operative upon sequential engagement of said creep and stop switches with the associated creep and stop cams to actuate said rate change drive mechanism for initiating creep movement and after a predetermined interval to deactuate said drive mechanism for stopping rotation of said member in a position selected by said selector switch mechanism.

3. In a machine tool work positioning mechanism, a frame, a table journalled in said frame for axial and for indexable movement, a pallet clamp movably carried by said table for axial movement, said pallet clamp being provided with guideways perpendicular to its axis of movement and being guidably constrained by said table for indexable movement therewith, a work supporting pallet provided with depending guide flanges and being slidably releasable from operative engagement with the guideways presented by said pallet clamp, first power operable means connected to urge said clamp in one direction for releasing a pallet positioned thereon from clamped engagement with said table, second power operable means connected to urge said table axially in one direction for releasing said table from clamped engagement with said frame, an index control system including third power operable means actuatable to rotatably move said table and said pallet clamp to a predetermined indexed position whenever said table is released from clamped engagement with said frame, and control means connected to effect reversed operation of said first and second power operable means for respectively urging a pallet carried by said clamp into clamped engagement with said table and for urging said table into clamped engagement with said frame.

4. In a machine tool having a frame, an axially movable index table journalled to rotate in said frame, a clamp provided with a guideway and being carried by said table for axial and indexable movement therewith, a work pallet slidably engageable with said clamp in a position on said table, said clamp and said pallet being provided with a releasably engageable flanged connection operative to constrain a pallet engaged thereon against relative axial movement, an index control system selectively actuatable to rotate said table to a selected indexed position for positioning said clamp and a pallet engaged thereon, and reversibly operative power means respectively operable to urge said clamp in one direction for clamping a pallet to said table and to urge said table in one direction for clamping said table to said frame in a preselected indexed position.

5. In a machine tool having a frame, work positioning and clamping means comprising a single clamp and a concentrically disposed rotary index table carried for axial movement relative to each other and to said frame, a pallet, said table being journalled to rotate in said frame and being provided with guide means constraining said clamp for indexable movement therewith, said clamp comprising a way surface so configured as to slidably receive said pallet and to positively retain said pallet engaged thereon in fixed angular relationship to said table, said pallet provided with depending flanges adapted to be slidably engaged upon said clamp in an operating position on said table, first power operable drive means connected to effect relative axial movement of said clamp and said table for positively clamping a pallet to said table, second power operable drive means connected to indexably rotate said table to a selected index position, and third power operable drive means connected to effect relative axial movement between said table and said frame for clamping said table in the selected index position.

6. In a machine tool having a frame provided with an operating station for indexably positioning and for clamping a pallet in selected position; longitudinally spaced apart stationary pallet guideways; a bodily movable clamp presenting a guideway positionable in alignment between said stationary guideways and adapted to cooperate therewith to constitute a transfer pathway for pallets, said movable clamp being carried for bodily axial movement along a line substantially normal to the effective path of said guideways; a rotatable index table journalled to rotate in said frame; said movable clamp being disposed on said table for relative axial clamping and indexable movement therewith; a flanged work supporting pallet movable along one of said stationary guideways into slidable engagement with the clamp guideway and into an operating position on said table; power drive means connected to urge said clamp axially for clamping a pallet engaged thereon to said table; an index control system connected to rotate said table as well as said movable clamp and a pallet engaged thereon to a selected index position relative to said frame; second power drive means connected to urge said table into fixedly clamped engagement with said frame; and control means connected to actuate said power drive means for releasing said table from said frame, for moving said clamp axially to released position, and for actuating said index control system to indexably move said table for returning the guideway presented by said movable clamp into transfer guiding alignment with said stationary guideways to facilitate slidable removal of a pallet from said clamp and slidable movement of another pallet into operating position upon said clamp.

7. In a system for selectively controlling movement of an indexable member; a power drive selectively actuatable to move said member at a fast or slow rate; a plurality of binary coded cams connected to be driven in synchronism with said member; a creep cam and a stop cam driven in synchronism with said binary coded cams at a different rate of speed; a plurality of coded position switches, a creep switch, and a stop switch positioned to be actuated by corresponding ones of said cams; a plurality of binary coded selector switches actuatable into positions of anti-coincidence with respect to said cam actuated switches for effecting controlled indexing movement of said member; circuit control means actuatable to activate said power drive for initiating fast indexing movement of said member whenever anti-coincidence exists between said cam actuated switches and said selector switches; selector means for presetting said selector switches to positions of anti-coincidence for selecting the next indexed position and means for actuating said circuit control means to actuate said power drive to initiate an indexing movement; a power driven retracting plate adapted to support said creep switch and said stop switch in a normal position to be engaged by said corresponding cams and being connected to move said creep switch and said stop switch to an inoperative retracted position at the start of a fast indexing movement, said power driven plate being connected to return said associated switches to normal positions upon indexable advancement of said position determining cams a distance sufficient to effect binary coded actuation of said position switches for establishing coincidence with said selector switches, said creep switch being actuated upon return movement to its normal position by said creep cam for actuating upon return movement to its normal position by said creep cam for actuating said power drive to continue indexing movement of said member at a creep rate, said stop switch being actuated by said stop cam during subsequent indexing of said member at creep rate to actuate said power drive for stopping movement of said member in selected indexed position.

8. In a machine tool; a frame; an axially movable index table journalled to rotate in said frame; a clamp presenting a guide way carried by said table for axial movement and being guidably constrained for rotation therewith; a work supporting pallet being slidably positionable upon said clamp, said clamp and said pallet being provided with a releasably engageable flanged connection to preclude relative axial movement therebetween; first reversibly operative power drive means selectively operable to urge said clamp in one direction in a manner to releasably clamp a pallet engaged thereon to said table; second power drive means connected to indexably drive said table at a fast or slow rate; a control mechanism operative to indexably control movement of said table comprising a creep cam, a stop cam and a plurality of binary coded cams connected to be driven in synchronism with said table; a plurality of position determining switches comprising a creep switch, a stop switch and a plurality of binary coded switches respectively carried by said frame in position to be actuated by corresponding ones of said cams; a plurality of binary coded selector switches actuatable to positions of anti-coincidence with respect to said cam actuated binary coded switches for selecting the next indexed position of said table; circuit control means including a source of power actuatable to activate said second power drive means for initiating fast indexing movement of said table whenever anti-coincidence exists between said cam actuated coded position switches and said selector switches; an index selector operable to actuate said selector switches; an index selector operable to actuate said selector switches to selected positions of anti-coincidence with respect to said position switches; a cycle start switch operative to actuate said circuit control means for initiating indexing movement of said table at a fast rate; a power driven retracting plate supporting said creep switch and said stop switch and connected to retract said associated switches upon initiation of an indexing movement of said table at a fast rate; said power driven retracting plate being connected to return said creep switch and said stop switch to their normal positions upon indexable advancement of said table to a position re-establishing coincidence between said cam actuated position switches and said preset selector switches; said creep switch being actuated by its corresponding cam upon return movement to normal position to activate said second power drive means for reducing the speed of continued table indexing from a fast to a slow rate, said stop switch being subsequently actuated by its corresponding cam to activate said second power drive means for stopping indexing movement at a creep rate upon arrival of said table in selected position; and third reversibly operative power drive means connected to urge said table axially into clamped engagement with said frame in the selected indexed position.

9. In a machine for operating on workpieces, indexable support means journalled to rotate in said machine and comprising a rotary table and a single way clamp operatively connected for simultaneous indexable movement, said table and said way clamp being carried for releasable axial clamping movement relative to each other and relative to said frame, a pair of releasable coupling members respectively secured to said machine and said table in a manner to be releasably engaged to effect final positioning upon axial clamping movement therebetween, a work supporting pallet slidably engageable with said way clamp above said table, said pallet and said way clamp being provided with a releasable flanged connection to preclude axial movement of said pallet to said way clamp during clamping, cooperatively intermeshing positioning means respectively provided on adjacent portions of said pallet and said table adapted to be releasably engaged for effecting final positioning during axial clamping movement of said way clamp, a power drive operable to effect selective indexable movement of said table and said way clamp having a pallet engaged thereon relative to said machine, and power drive means respectively connected to effect axial movement of said way clamp and said table for respectively clamping said pallet to said table and said table to said machine.

(References on following page)

References Cited in the file of this patent

UNITED STATES PATENTS

| | | |
|---|---|---|
| 787,339 | Massa | Apr. 11, 1905 |
| 1,094,026 | Simmonds | Apr. 21, 1914 |
| 1,411,597 | Trask | Apr. 4, 1922 |
| 1,928,430 | Lindgren | Sept. 26, 1933 |
| 2,202,117 | Muller | May 28, 1940 |
| 2,270,300 | Hothersall | Jan. 20, 1942 |
| 2,309,998 | Tucker | Feb. 2, 1943 |
| 2,392,169 | Mansfield | Jan. 1, 1946 |
| 2,615,288 | Klay | Oct. 28, 1952 |
| 2,659,157 | Aller | Nov. 17, 1953 |
| 2,745,167 | Cross | May 15, 1956 |
| 2,748,624 | Costello | June 5, 1956 |
| 2,829,566 | Gecks | Apr. 8, 1958 |

FOREIGN PATENTS

| | | |
|---|---|---|
| 488,920 | Great Britain | Jan. 11, 1939 |